TWO-WAY FACSIMILE COMMUNICATION SYSTEM

Filed March 3, 1950 7 Sheets-Sheet 1

INVENTORS
G. H. RIDINGS
F. G. HALLDEN
F. L. CURRIE
BY
A. A. Lomas
ATTORNEY

Aug. 12, 1952 G. H. RIDINGS ET AL 2,606,963

TWO-WAY FACSIMILE COMMUNICATION SYSTEM

Filed March 3, 1950 7 Sheets-Sheet 2

INVENTORS
G. H. RIDINGS
F. G. HALLDEN
F. L. CURRIE

BY

A. A. Thomas

ATTORNEY

TWO-WAY FACSIMILE COMMUNICATION SYSTEM

Filed March 3, 1950 7 Sheets-Sheet 3

INVENTORS
G. H. RIDINGS
F. G. HALLDEN
F. L. CURRIE
BY
A. A. Thomas
ATTORNEY

Aug. 12, 1952 G. H. RIDINGS ET AL 2,606,963
TWO-WAY FACSIMILE COMMUNICATION SYSTEM
Filed March 3, 1950 7 Sheets-Sheet 4

INVENTORS
G. H. RIDINGS
F. G. HALLDEN
F. L. CURRIE
BY
A. A. Thomas
ATTORNEY

TWO-WAY FACSIMILE COMMUNICATION SYSTEM

Filed March 3, 1950 7 Sheets-Sheet 5

INVENTORS
G. H. RIDINGS
F. G. HALLDEN
F. L. CURRIE

BY A. A. Thomas
ATTORNEY

INVENTORS
G. H. RIDINGS
F. G. HALLDEN
F. L. CURRIE
BY
A. H. Thomas
ATTORNEY

TWO-WAY FACSIMILE COMMUNICATION SYSTEM

Filed March 3, 1950 7 Sheets-Sheet 7

INVENTORS
G. H. RIDINGS
F. G. HALLDEN
F. L. CURRIE
BY
A. A. Thomas
ATTORNEY

UNITED STATES PATENT OFFICE 2,606,963

TWO-WAY FACSIMILE COMMUNICATION SYSTEM

Garvice H. Ridings, Summit, N. J., Frederick G. Hallden, Bellerose, N. Y., and Frank Leslie Currie, Plainfield, N. J., assignors to The Western Union Telegraph Company, New York, N. Y., a corporation of New York Application March 3, 1950, Serial No. 147,372

26 Claims. (Cl. 178—6.6)

This invention relates to the art of facsimile telegraphic communication, and its general object is to provide a novel system for the speedy two-way transmission of messages between a central telegraph office and the business places of patrons who have subscribed to this service, which eliminates the time formerly required for messenger pick-up and delivery.

The basis of our facsimile telegraph system between patron and main office comprises a transmitter-recorder (usually called a transceiver) in each patron's office adapted to be operatively connected with a concentrator unit in the main office for sending as well as receiving messages. This concentrator unit consists of the required number of transmitters and recorders, at least one of which is usually free to be instantly connected to the patron's machine either to facsimile a telegram to his office or to record a message coming from his machine.

In the present setup of our system the patron's transceiver is a small desk machine which even an unskilled office worker can operate and which, once started, is wholly automatic in its two-way operation for transmitting and receiving messages. This machine is connected with a central telegraph office through a novel control system by which an operator can instantly plug in a recording machine to receive a patron's message or plug in a transmitter to call the machine of the patron for whom an incoming message is intended.

The patron's machine is such that when called by the main office it automatically sets itself up as a receiver, and when calling the main office it automatically becomes a transmitter. This does away with the manually set send-receive switch required in prior facsimile transceivers and simplifies the use of the machine to such an extent that anyone can work it.

When a patron wants to send a telegram to the main office, he simply places the prepared sheet on the scanning drum of his machine and closes the start switch. At the main office the operator gets a signal from the calling machine, whereupon she plugs in one of the recorders and presses a start button. These are the only manual operations required at the two ends of the system for the automatic transmission and recording of a patron's message. When the scanning of this message is completed, both machines are automatically shut down and the operator at the main office gets a signal to disconnect the recorder from the line.

When a message for a patron comes in at the main office, the operator loads it on a transmitter, plugs the machine into the patron's line jack, and presses a call button. This signals the patron's office that the central operator wishes to transmit a message. After placing a recording blank on his drum, the patron merely closes the start switch, whereupon the message starts coming in. After the complete message has been transmitted, the patron gets a signal to advise him of that fact and he acknowledges receipt of the message by pressing a button. At the main office the transmitter is automatically shut down after sending the signature on the message, and the operator upon receiving the patron's acknowledgment of the message unplugs the transmitter.

The specific features of novelty that characterize our invention will be set forth in the detailed description of the accompanying drawings, which show diagrammatically a practical embodiment of our automatic two-way facsimile system. In these drawings.

Figure 2:
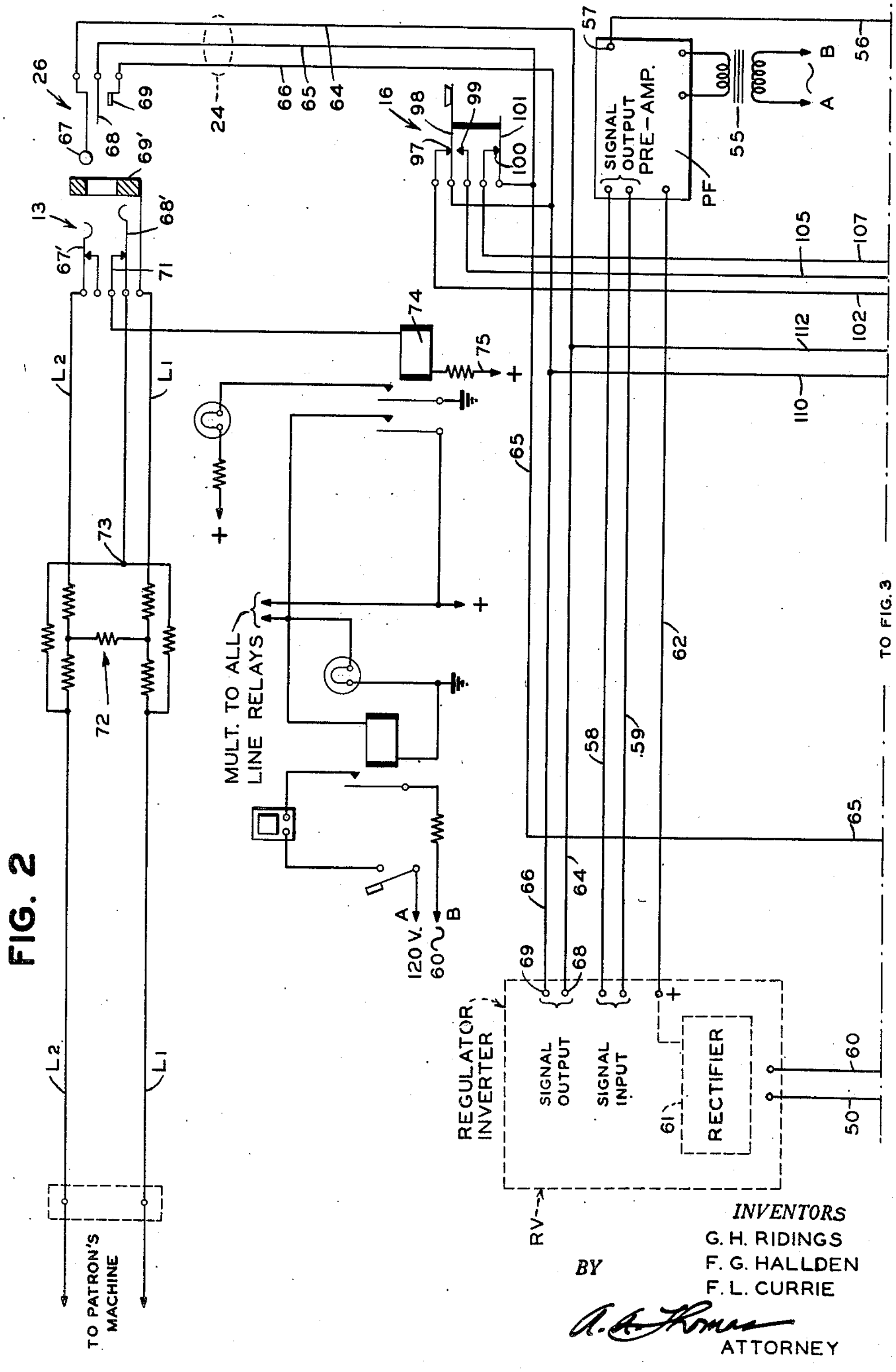
Figure 3:
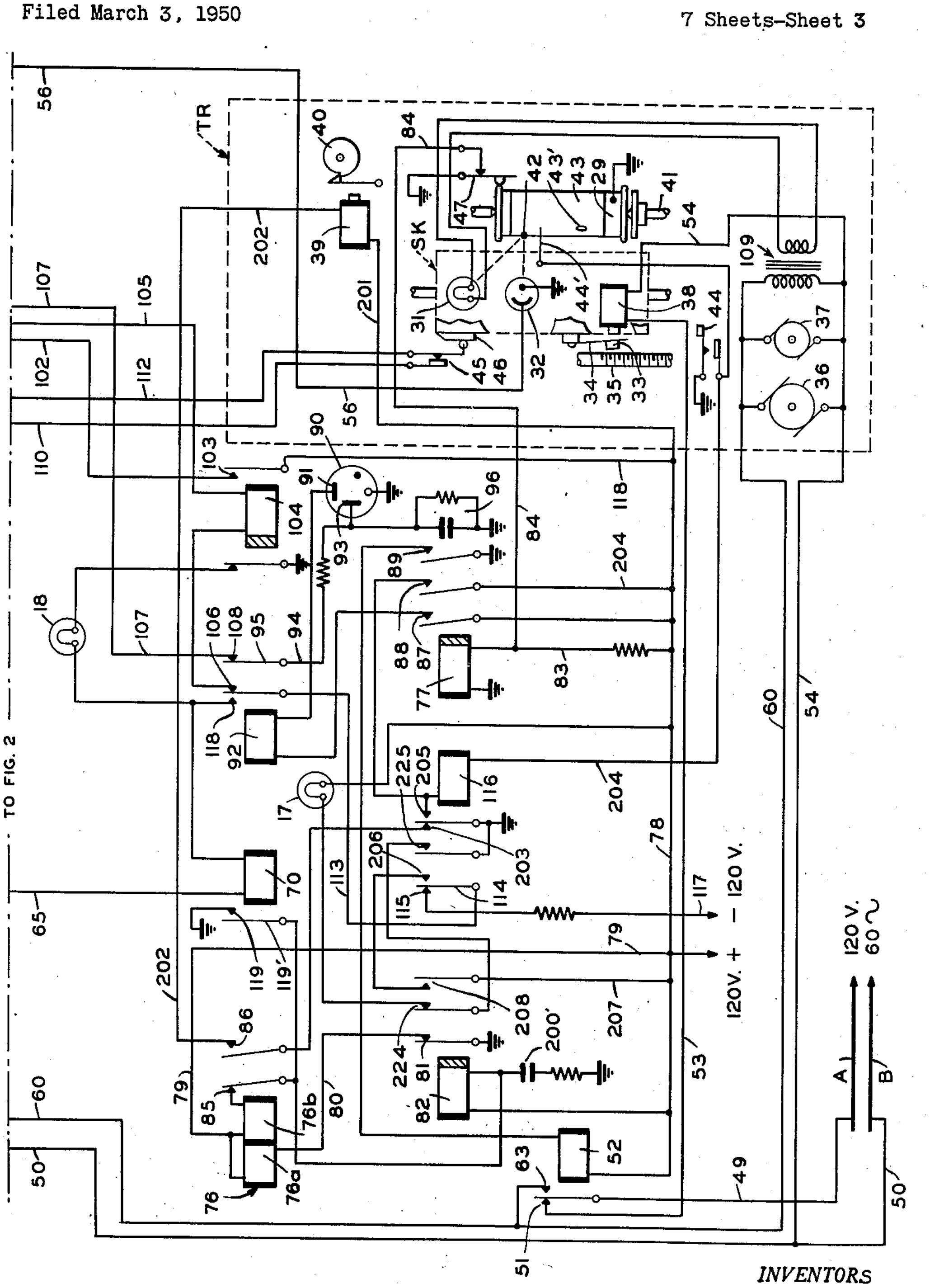
Figure 4:
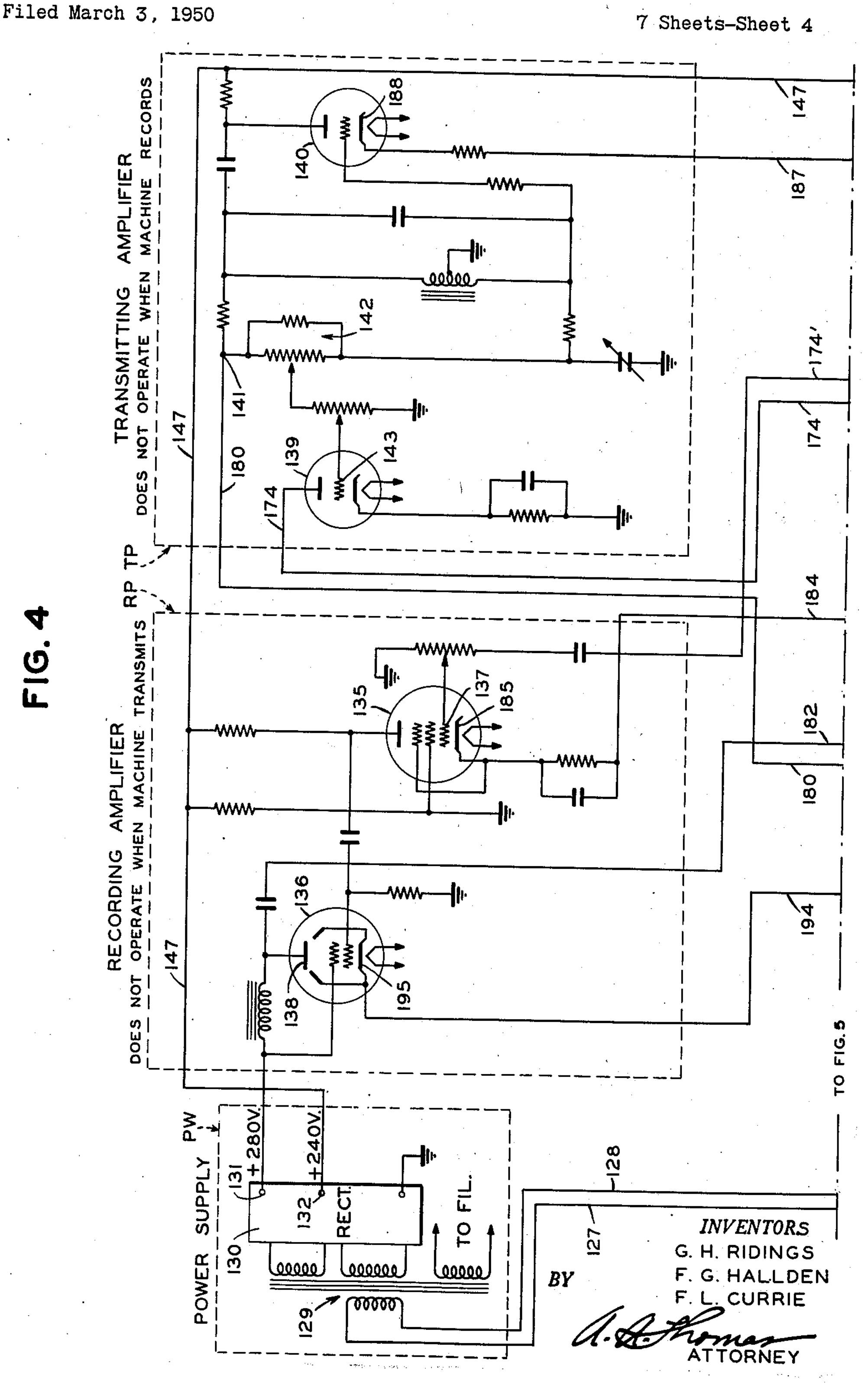
Figure 5:
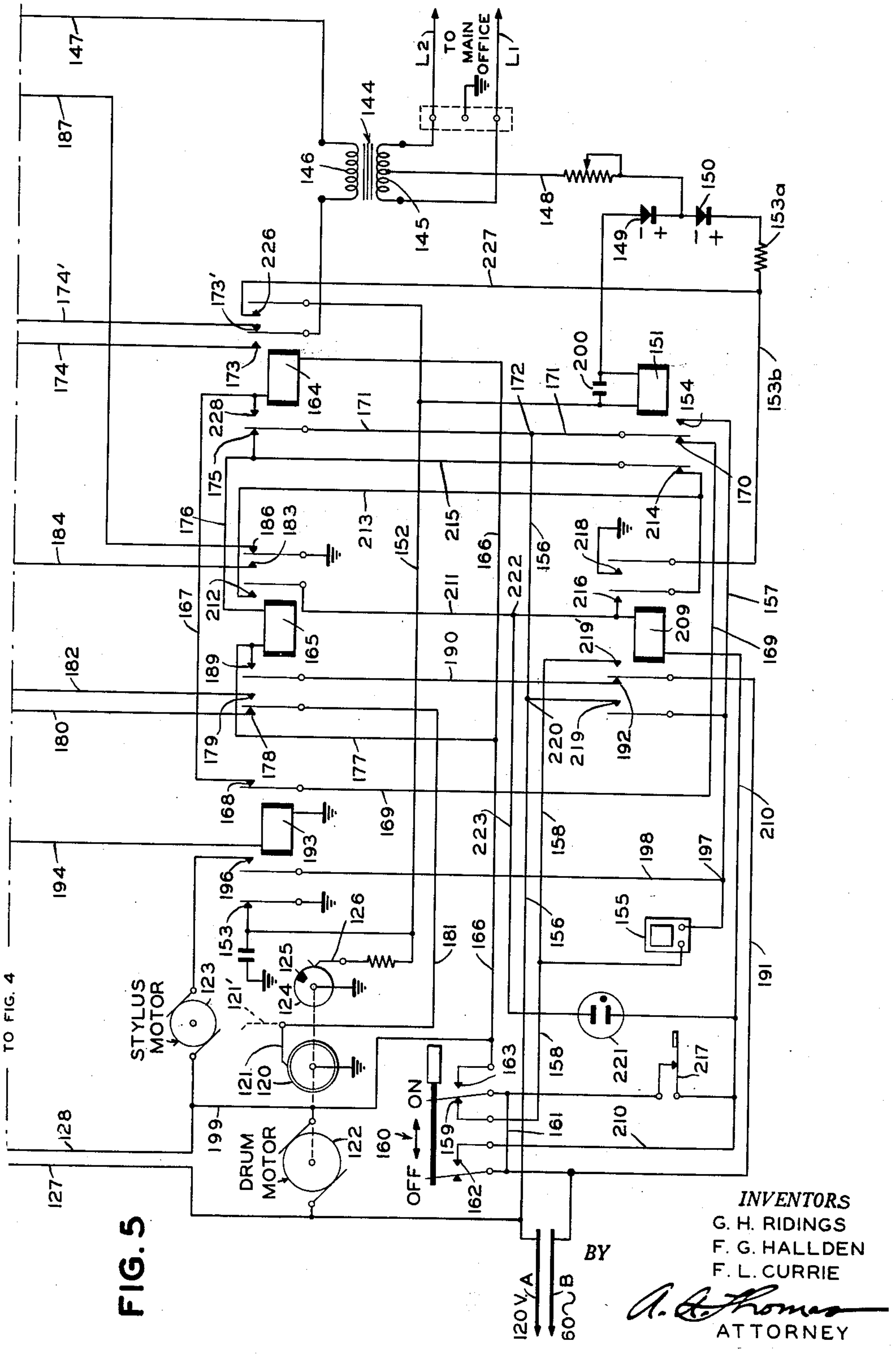
Figure 6:
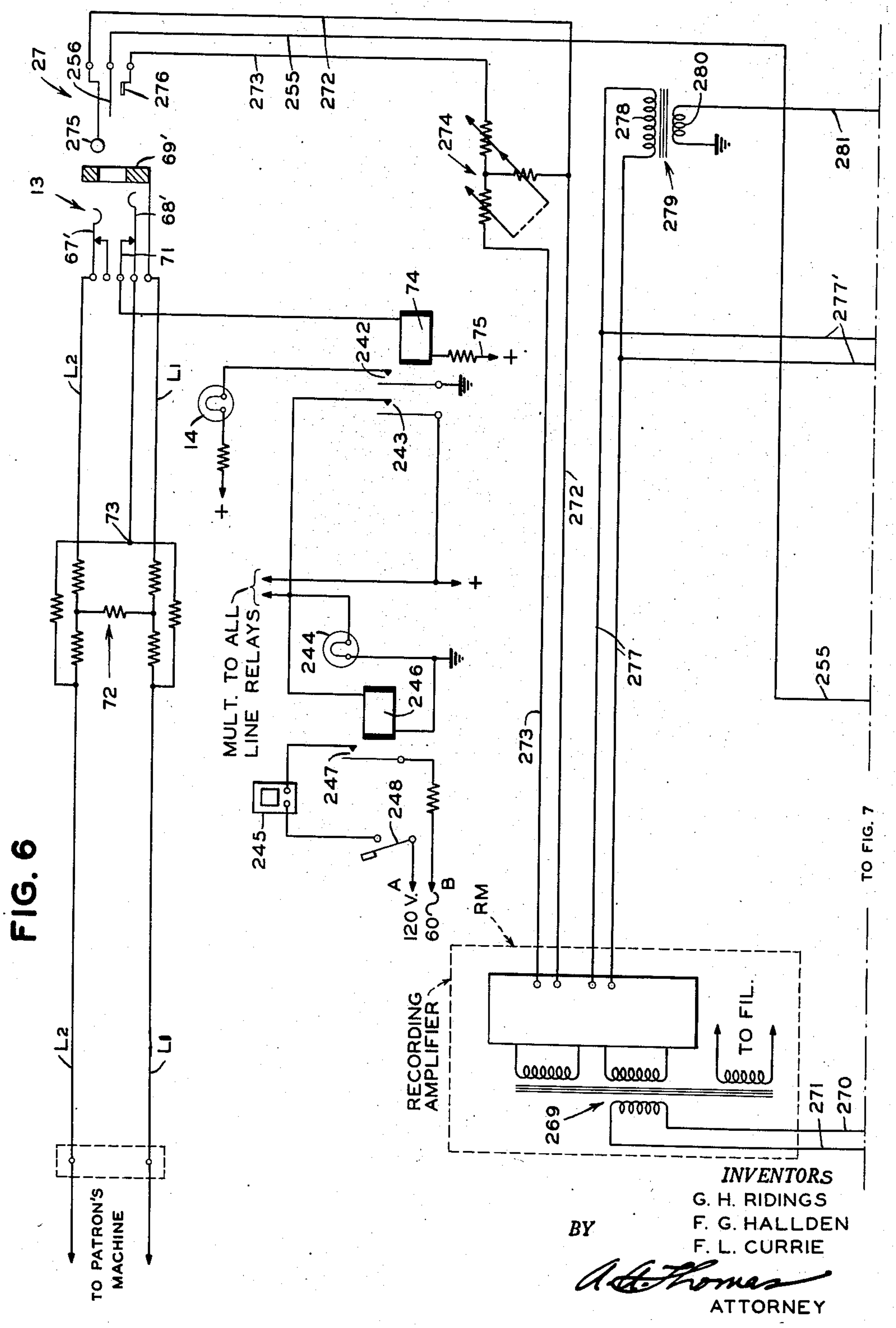
Figure 7:
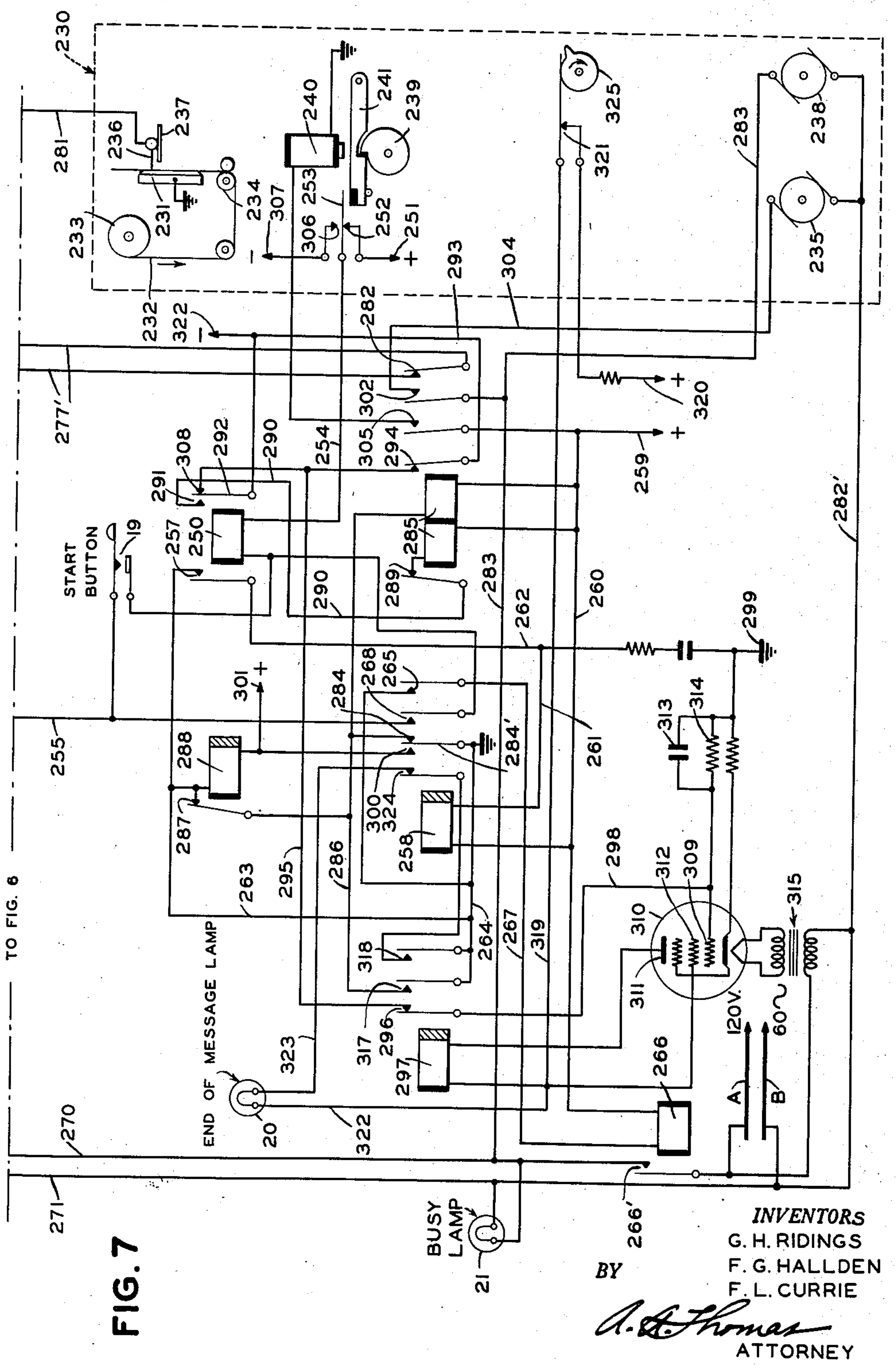

Figs. 2 and 3 together show the transmitter circuits at the main office;

Figs. 4 and 5 together illustrate the transmitter-receiver circuits of the patron's machine; and Figs. 6 and 7 together show the recorder circuits at the main office.

Figures 1, 1A:
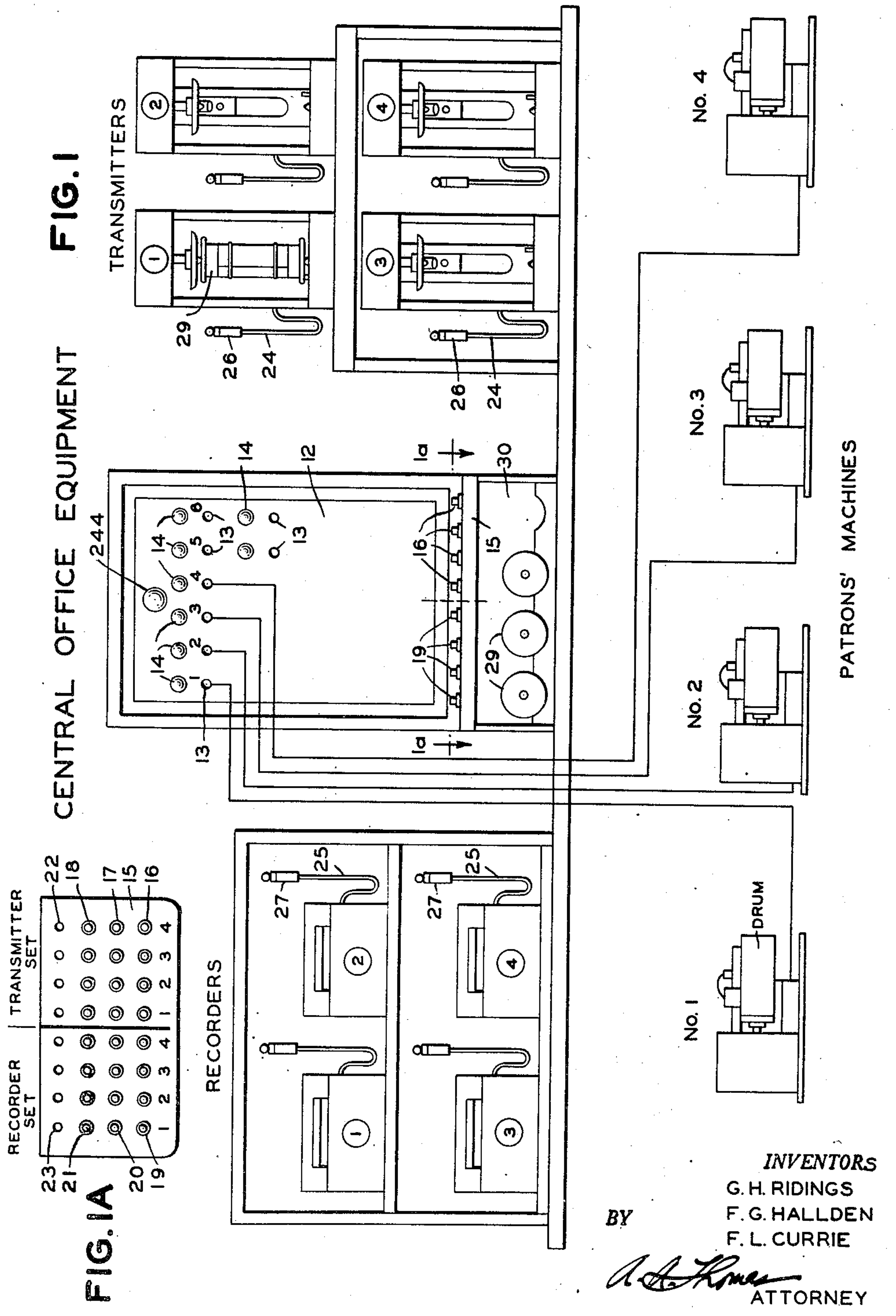
Fig. 1 is a schematic representation of our system.
Fig. 1A is a section on line 1*a*—1*a* of Fig. 1 to show the arrangement of certain push buttons and signal lights.

The schematic illustration in Fig. 1 gives a general idea of the central office equipment in our system. Each concentrator unit of this equipment comprises a group of transmitters and a group of recorders arranged on either side of a panel 12 which carries a series of line jacks 13 and signal lights 14 for the patrons' machines. This compact arrangement enables a single operator to take care of a concentrator unit.

For the purposes of this description we have shown in Fig. 1 a group of four transmitters, four recorders and four patrons' machines. Obviously the number of machines needed at a main office will depend upon the number of patrons it has to serve. For example, in one installation of our system each concentrator is equipped to serve fifty patrons and in that case the panel 12 has fifty line jacks 13 and as many signal lights 14 arranged directly over the jacks. Every jack and light pair 13—14 is numbered to identify a particular patron. Thus, jack No. 1 connects with the machine of patron No. 1, jack No. 2 is for the machine of patron No. 2, and so forth. In other words, the transmission line of each patron's machine terminates in his particular jack 13 on the concentrator panel 12.

In front of panel 12 is a small table or shelf (Fig. 1A) on which are mounted two sets of push buttons with signal lights, the set on the right being for the transmitters and the left one for the recorders. The transmitter set comprises a front row of call buttons 16, one for each transmitter, a row of white lights 17 (called "acknowledge" lamps), and a row of red "busy" lights 18. Similarly, in the recorder set there is a row of start buttons 19, one for each recorder, a row of white lights 20, called "end-of-message" lamps, and a row of red "busy" lights 21. Behind the two rows of red lights is a row of holes 22 for the flexible connecting cables 24 of the transmitters and a row of holes 23 for the cables 25 of the recorders. Each transmitter cable 24 terminates in a plug 26 and the recorder cables have each a plug 27.

To promote clearness in Fig. 1 we have shown the cable and plug of each machine in a schematic way beside it, but actually the transmitter plugs 26 rest on table 15 over the cable holes 22 and the recorder plugs rest over the holes 23. Each plug is in a numbered position corresponding to the number of its machine. Thus, the plug for transmitter No. 1 is in No. 1 position in the row of holes 22, and so on for the other transmitters. The same is true for the position of the recorder plugs 27 over the cable holes 23. In other words, the connection plug of each machine appears on table 15 in line with the push button 16 or 19 of that machine.

*General operation*

Let us suppose that patron No. 1 wishes to transmit a message to the main office. He places the prepared copy around the scanning drum of his machine and closes the start switch. The drum will start to rotate and at the main office the patron's lamp 14—No. 1 is automatically lighted to inform the operator that patron No. 1 has prepared to send a message. The operator inserts the plug 27 of any available recorder (say No. 3) into jack 13—No. 1, which is directly below the lighted calling lamp. Then she presses the start button 19—No. 3, thereby connecting the transmission circuit of the calling machine with recorder No. 3. The patron's message is now being facsimiled to the main office, from where it will be forwarded to its destination. It takes only two minutes or less to dispatch a telegram in this way from a patron's place of business to the main telegraph office.

During the recording of the patron's message the red lamp 21—No. 3 (associated with recorder No. 3) remains lighted as an indication to the operator that the patron's message is coming over and is being recorded. When the entire message has been transmitted from the patron's office, white lamp 20—No. 3 on panel 12 automatically lights to let the operator know that the complete message has been recorded. She thereupon unplugs the recorder and removes from it the recorded facsimile of the transmitted message.

Now let us assume that a message has arrived at the main office for patron No. 4. The operator places this message on the scanning drum 29 of any transmitter that happens to be free, say transmitter No. 1. She first inserts the plug 26 of this transmitter into line jack 13—No. 4 and then she presses the button 16—No. 1. The effect of this operation is to sound a buzzer in the patron's machine as a signal that the central office has a message for him. Accordingly, the patron will place a sheet of recording paper on his drum and close the start switch, whereby the machine is automatically set up as a recorder. The closing of the patron's start switch automatically starts the main office transmitter No. 1 to scan the message on drum 29, while at the saime time the red lamp 18—No. 1 lights up to indicate that the patron's machine is recording.

When the entire message on drum 29 has been scanned, the patron is automatically advised of that fact by the sounding of his buzzer and the lighting of a lamp. In response to this signal the patron will remove the received telegram from his drum (which has stopped rotating) and operate an "acknowledge" button. This extinguishes the red "busy" lamp 18—No. 1 on the concentrator panel and lights the "acknowledge" lamp 17—No. 1 to indicate to the operator that the patron has received the telegram. The operator now unplugs the transmitter and removes the drum which stopped rotating when the patron operated his "acknowledge" button. Removal of the drum puts out the "acknowledge" lamp and shuts off the power from the transmitter, which is now in normal condition ready for the next operation. A supply of transmitter drums 29 may be kept in a chamber 30 below the panel 12.

*The transmitter circuits at the main office*

The foregoing outline of the general operation of our two-way facsimile system will now be followed by a detailed consideration of the novel circuits which make such operation possible, and we shall first take up the transmitter circuits at the main office. In describing these circuits we shall assume that Fig. 3 is placed below Fig. 2 as a continuation thereof.

In Fig. 3 the dotted rectangle TR represents an optical transmitter like that which forms the subject matter of the copending application of John H. Hackenberg, Serial No. 122,326, filed October 19, 1949. For the purpose of the present specification we have indicated by schematic symbols only such parts of that machine as are necessary to describe the transmitting circuits of our system. Accordingly we need only mention briefly that the transmitter TR has a removable drum 29 which carries the message sheet to be scanned by optical mechanism mounted on a vertically slidable carriage SK. The optical scanning mechanism is represented by an exciter lamp 31 and a photocell 32, the operation of which in facsimile work is well understood.

The carriage SK carries a half-nut 33 mounted on a spring arm 34, which normally holds the half-nut in engagement with a rotary feed screw 35. A synchronous motor 36 drives both the drum 29 and the feed screw 35 at their respective speeds, and a second motor 37 mounted on carriage SK operates a chopper disk (not shown) to interrupt the light beam before it strikes the photocell 32. A solenoid or magnet 38 is adapted when energized to hold the half-nut away from the feed screw 35, and a phase magnet 39 releases when energized a clutch 40 to connect the drum driving shaft 41 with the motor 36. It will therefore be clear that when the magnet 38 is unenergized and the magnet 39 is energized, the motor 36 will rapidly rotate the scanning drum 29 and simultaneously slide the carriage downward to move the optical scanning spot 42 slowly along the message sheet 43 on the drum.

When the scanning carriage SK has moved through its entire path of travel for long messages, it closes a normally open switch 44, which we call the end-of-message switch. The carriage SK may also have mounted thereon a contactor 44' arranged to engage the metal drum 29 through a hole 43' punched in the message sheet 43 after the signature on a short message. When the contactor 44' touches the grounded drum, the effect is the same as if the switch 44 were closed by the carriage at the end of its travel. The function performed by switch 44 or the contactor 44' when connected to ground will presently be explained.

In the present instance the carriage SK also controls a switch 45 which is normally open and is held closed by a cam piece 46 on the carriage until the latter has moved down a certain distance from start position. The purpose of holding the switch 45 closed during this interval at the beginning of a scanning cycle will be explained when we describe the circuits of the patron's transceiver in Figs. 4 and 5. A third switch 47 in transmitter TR is normally open and is closed only when a drum 29 is in operative position in the machine. When the drum is removed, the switch 47 automatically opens for a purpose to be explained later.

The electric power required for the transmitter is indicated by a pair of bus bars A and B, which represent a commercial source of local alternating current power, say of 120 volts and 60 cycles. The bus bar B may be grounded. A second source of power for certain relay circuits is a positive battery potential and a negative battery potential, usually about 120 volts. To simplify the circuit connections in Figs. 2 and 3 with the A.-C. and D.-C. power supply, we have used the reference letters A and B at those terminal points that are connected to the bus bars. Likwise, terminals marked with a plus sign go to positive battery and those marked with a minus sign connect to negative battery. It is to be understood that any voltage figures mentioned here or appearing in the drawings are solely for purposes of description.

We may assume that the leads 49 and 50 are connected to the bus bars A—B by being plugged in. When the plug is inserted, the magnet 38 is energized at once to hold the scanning carriage SK disconnected from the feed screw. This magnet circuit goes from bus bar A, lead 49, closed contact 51 of a relay 52 (not energized), wire 53, through the winding of magnet 38, and by wire 54 to bus bar B. The only other device energized upon insertion of the power plug is a step-down transformer 55 (Fig. 2) which furnishes the filament current for the vacuum tubes of a preamplifier PF. As amplifiers of this type are well known both in structure and function, it is sufficient to indicate this apparatus in block form. The heating of the tube filaments in amplifier PF normally keeps this device in standby condition.

The photocell 32 of the optical scanning mechanism is connected by a wire 56 to the signal input terminal 57 of amplifier PF, and the amplified signal output goes by wires 58 and 59 to the input terminals of a regulator-inverter RV. We have indicated this apparatus in block diagram only, because any practical construction of regulator-inverter may be used to invert the scanning signals and regulate the white signal or background voltage to such a level that the recording will not show background. This double function of the regulator-inverter in facsimile systems is well known and requires no further explanation. The A.-C. power input supplied by conductors 50 and 60 operates a rectifier 61 in the apparatus RV to provide plate battery for its own tubes and also through wire 62 for the tubes of the amplifier PF. Let it be noted that the device RV is not energized from the bus bars A—B until the relay 52 is operated to close its front contact 63 which is connected to conductor 60.

The plug-in cable 24 of each transmitter consists of three conductors 64, 65 and 66, which are connected respectively to the tip 67, ring 68 and sleeve 69 of plug 26. The tip and sleeve wires 64 and 66 are connected to the output terminals 68 and 69 of the regulator-inverter RV. The sleeve wire 65 goes to one side of a relay 70. Each of the jacks 13 consists of a tip spring 67', a ring spring 68', which is normally closed against its fixed contact 71, and a sleeve 69'. It will be understood that when a plug 26 is inserted into any jack 13, the plug contacts 67—68—69 respectively engage the jack contacts 67'—68'—69' and the jack ring contact 71 is automatically opened.

The tip spring 67' and sleeve 69' of jack 13 are connected through an H-pad 72 to a pair of transmission wires L2 and L1 respectively, and the ring spring 68' is connected to the central point 73 of the pad. The jack contact 71 (usually called the ring normal) is connected to one side of a line relay 74, which is connected on its other side to a positive battery terminal 75. Consequently, a standby positive potential is normally applied to lines L1—L2 at the transmitter through the relay 74. However, the circuit of this relay is not closed at this time because it is open at the patron's machine, as will appear later. It should be understood that a transmission pair L1—L2 and a line relay 74 are associated with each one of the patrons' line jacks 13. The line L1—L2 operated on a simplex basis to carry not only the facsimile signals but also the battery control circuits.

In the normal or idle condition of the transmitter—that is, with the plug disconnected and no drum in the machine—the battery power keeps two relays energized, namely, a double-coil relay 76 and a slow-release relay 77. The normal energizing circuit of relay 76 goes from the plus battery conductor 78, wire 79, through the left coil 76*a* of the relay, and by wire 80 to ground through the closed contact 81 of a relay 82, which is not energized. The circuit of the right-hand coil 76*b* of relay 76 remains open until the relay 70 is energized. The circuit of relay 77 goes from battery lead 78, wire 83 and through the relay coil to ground. A shorting wire 84 connects wire 83 with the switch 47. When there is no drum in the machine, the switch 47 is open and the relay 77 is not shorted out by wire 84. It will thus be seen that normally the front contact 85 of relay 76 is closed and its back contact 86 is open, whereas the energized relay 77 normally holds all three of its back contacts 87—88—89 open.

A cold-cathode gaseous tube 90 has its plate anode 91 connected to one side of a relay 92, the other side of which goes to contact 87 of relay 77. The starting anode 93 of tube 90 is connected to a wire 94, which is connected at one end to the armature contact 95 of relay 92, and the other end of wire 94 goes to ground through a condenser-resistor network 96. It is thus clear that the circuit of relay 92 goes through the cold-cathode tube 90, so that this relay is energized only when the tube fires upon the application of sufficient positive voltage to the starting anode 93. The conditions under which the firing of tube 90 occurs will be set forth in due course.

As previously mentioned, each transmitter has its own call button 16 for calling a patron's attention to his machine when a message is to be transmitted to him. This call button, as shown in Fig. 2, has five contacts numbered 97 to 101. The contacts 98 and 101 are movable spring arms normally biased against their associated contacts 97 and 100, respectively. Contact 97 is connected by a wire 102 to a make contact 103 of a slow-release relay 104. The spring contact 98 is connected to conductor 66, which is one of the output leads of the regulator-inverter RV and goes to the sleeve 69 of plug 26. The normally open contact 99 connects by wire 105 to one side of the relay 104, the other side of which goes to the back contact 106 of relay 92. Contact 100 of the call button connects through wire 107 to contact 108 of relay 92, and the spring contact 101 is connected to wire 65 which connects one side of relay 70 to the ring 68 of plug 26.

When the operator at the central office has a message to transmit to a certain patron, she wraps the sheet around the drum and then performs three manual operations in this order: first, she mounts the loaded drum in the machine; second, inserts the plug 26 into the patron's line jack 13; third, presses the transmitter call button 16. Now let us see what each of these manual operations does in the transmitter circuits of Figs. 2 and 3, without considering at this time their effect on the patron's transceiver.

The mounting of drum 29 in the machine closes switch 47 and short-circuits the normally energized relay 77 which releases all its contacts, whereby relay 52 is operated to turn the power on and conditions the machine for operation by energizing the drum motor 36, the chopper motor 37, and the exciter lamp 31 through transformer 109.

The insertion of plug 26 into jack 13 connects the output leads 64 and 66 of the regulator-inverter RV to the transmission wires L2 and L1, respectively, through the tip 67 and sleeve 69 of the plug. However, at this time the output leads 64 and 66 are short circuited by wires 110 and 112 through the closed switch 45 (Fig. 3) which remains closed until the scanning carriage has moved down a certain distance from start position.

Having inserted the plug, the operator presses the call button 16 for a second or two, then releases it. While the button is held down, the closed contacts 98 and 99 connect one side of relay 104 to line L1 through wire 105, conductor 66 and through the plug and jack sleeves 69—69'. The other side of relay 104 goes through back contact 106 of relay 92 (not energized), wire 113, and through closed contacts 114—115 of relay 116 (not energized) to a source of negative battery 117. This battery circuit goes through relay 104 and through H-pad 72 over lines L1—L2 and is grounded at the patron's machine (as will be explained later), so that relay 104 is energized and closes its front contact 103 while the call button 16 is held down. It may be mentioned here that this negative potential put on lines L1—L2 operates a buzzer at the patron's machine.

When the call button 16 is released, the negative potential applied to simplex lines L1—L2 through relay 104 is interrupted at the open contact 99, but relay 104, being slow to release, holds its contact 103 closed for a brief interval after release of the call button. Therefore, the closing of contacts 97—98 of the released button connects the lines L1—L2 to the positive battery lead 78 through the following connections: wire 118, closed contact 103 of relay 104, wire 102, contacts 97—98, conductor 66, the plug and jack sleeves 69—69' and the H-pad 72. This positive voltage (usually 120 volts) is maintained for a fraction of a second before the relay 104 releases.

The positive battery thus maintained on transmission lines L1—L2 is also impressed on the starting anode 93 of tube 90, through the resistors of pad 72 to the central point 73, through jack and plug rings 68'—68, wire 65, closed contacts 101—100 of the released call button, wire 107, closed contacts 108 and 95 of relay 92 (not yet energized) and through wire 94 to the resistor network 96 attached to anode 93. This positive potential causes the timer tube 90 to fire, so that plate current is drawn through the coil of relay 92 from battery lead 78 through closed contact 87 of the deenergized relay 77. Relay 92 is, therefore, energized and its opened back contact 108 breaks the connection between the lines L1—L2 and the starting anode 93 of tube 90.

With relay 92 energized, negative battery is again impressed on lines L1—L2 from terminal 117, closed contacts 115—114 of relay 116 (not energized), wire 113, closed front contact 118 of relay 92, through coil of relay 70, wire 65 and through the plug and jack rings 68—68' to lines L1—L2. As before, this negative battery continues to sound the patron's buzzer until he responds by mounting a recording blank on his drum and closing the start switch of his machine. The energizing of relay 92 also closes the circuit of the associated red "busy" lamp 18 to let the operator know that connection with the called machine has been made. When the relay 70 is energized, it closes its contact 119 to place a ground on relay 82 and cause it to operate for a purpose that will be explained in due course.

The reason for applying a positive potential on lines L1—L2 after the first calling signal of negative potential has gone over is to test the system to determine if it is in condition to transmit from main office to patron. If, for instance, the patron has started his machine as a transmitter when the operator at the main office releases the call button, the tube 90 will not fire and the transmitter will not get through to the patron's machine. This fact would be indicated to the operator by the failure of the red "busy" lamp 18 to light, as will be fully explained later on. In that case, the operator would simply unplug the transmitter and plug in a recorder to receive the patron's message.

*The circuit of patron's machine*

We have learned what happens in the transmitter circuits at the main office when the operator calls a patron to send a message to his machine. Let us see how the patron's machine responds to that call.

Referring to Figs. 4 and 5, the mechanism of the patron's transceiver is represented schematically by a scanning drum 120, an electric stylus 121 for transmitting and recording, a synchronous motor 122 for operating the drum, and another motor 123 for moving the stylus along the paper on the drum. A phasing commutator 124 rotates with the drum and has an insulated segment 125 which a brush 126 engages briefly once for each turn of the drum. For the purposes of this description, it may be assumed that the construction of the patron's machine is like that set forth in the copending application of Ridings et al., Serial No. 33,354, filed June 16, 1948, to which reference may be had for such structural details as are not necessary to show or describe in the present specification.

The electric apparatus that goes with each machine includes (Fig. 4) a power supply unit PW, a recording amplifier RP, a transmitting amplifier TP, and (Fig. 5) a set of control relays with circuits to be presently described. It may be assumed that the units PW, RP and TP are like those shown and explained in detail in the aforesaid application of Ridings et al. So it will suffice here to present those electrical units in simplified form.

The power unit PW is connected by a pair of conductors 127 and 128 to bus bars A and B, which represent a source of local power, such as the usual 120 volts-60 cycle commercial supply. The conductors 127 and 128 go to the primary coil of a transformer 129, which is connected to a suitable rectifier 130 for supplying direct current to the tubes of the amplifiers RP and TP. The voltage figures placed at the rectifier output terminals 131 and 132 are merely for descriptive purposes to indicate the voltages as used in a particular installation of our system.

The recording amplifier RP has a signal input tube 135 and an output tube 136. The incoming signals are impressed on the grid 137 of tube 135, and the amplified recording voltage goes into the circuit of plate 138 of tube 136. This will be presently explained in connection with Fig. 5 and no further details of this amplifier need be described for an understanding of our system.

For the same reason, we need only mention that the transmitting amplifier TP comprises a signal input tube 139 and an output tube 140 which also functions as an oscillator to provide carrier frequency for the facsimile signals. The junction 141 may be considered as the input point of the facsimile signals coming from the stylus 121 when the machine operates as a transmitter. The variable signal voltage at point 141 goes through a bridge network 142 and is impressed at the proper level on the grid 143 of input tube 139.

As previously mentioned, the control circuits for each patron's machine are on a simplex basis over the transmission lines L1—L2, which connect the machine with the main office. Referring to Fig. 5, there is a line transformer 144 whose coil 145 is permanently connected to the transmission pair L1—L2. The other coil 146 of transformer 144 is connected at one side by a conductor 147 to the rectifier terminal 132 of the power unit PW. The line transformer 144 thus performs the double function of input and output transformer for the machine, depending upon whether the machine receives or transmits.

The center of coil 145 is connected by a wire 148 to the center of two solenium or similar rectifiers 149 and 150, which are connected in series so that negative battery placed on the simplex circuit at the main office will cause current to flow only through rectifier 149, while positive simplex potential will send current only through the other rectifier 150. The negative side of rectifier 149 is connected to a line relay 151 and the other side of this relay goes to a conductor 152, which is connected to the commutator brush 126 and also to a normally grounded relay contact 153. The positive terminal of rectifier 150 is connected through a resistor 153a to a conductor 153b which is grounded under certain conditions, as will be explained at the proper time. It will, therefore, be understood that relay 151 is energized only when negative battery is applied to the simplex leads L1—L2 at the main office. This happens, as we saw in Fig. 2, when the operator inserts a transmitter plug 26 in the patron's line jack 13. Of course, the control circuits in the transmitter and the rectifiers 149—150 can be so arranged that only positive battery will operate relay 151. Such reversal of battery polarity is within the scope of our invention.

The energizing of line relay 151 closes its front contact 154, which completes the circuit of a buzzer 155 through the following connections: From bus bar A over wire 156, relay contact 154, wire 157, through the buzzer coil, wire 158, closed contact 159 of a start switch 160 (now in "off" position), and through connection 161 to bus bar B. Hearing the buzzer, the patron places a sheet of recording paper on the drum 120 and moves the switch 160 to "on" position, whereby the contacts 162 and 163 are closed and connect with bus bar B. The machine is now automatically set up as a recorder by cutting out the transmitting amplifier TP and placing the recording amplifier RP into service.

This automatic conditioning of the machine is accomplished through a pair of relays 164 and 165, both of which are connected at one side to a conductor 166 which terminates in the switch contact 163. The other side of relay 164 is connected by a wire 167 to a normally closed relay contact 168, wire 169, contact 170 of line relay 151 (when not energized), wire 171 to junction point 172, and by wire 156 to bus bar A. When the line relay 151 is energized, its contact 170 is opened and prevents relay 164 from operating upon the closing of switch 160. Because relay 164 is not operated, its contact 173 remains open and keeps the input conductor 174 of the transmitting amplifier TP out of circuit. The other relay contact 173' is connected by a wire 174' to the grid 137 of input tube 135 of the recording amplifier RP.

On the other hand, the closing of start switch 160 completes the circuit of relay 165 as follows: from bus bar A, conductor 156, wire 171, closed contact 175 of the unenergized relay 164, wire 176, through the coil relay 165, wire 177, conductor 166 and through the closed switch contact 163 to bus bar B. The energized relay 165 opens its back contact 178 and closes its front contact 179. The open contact 178 disconnects the wire 180 which goes to the transmitting amplifier TP, and the closed contact 179 completes the recording circuit from stylus 121, through wires 181 and 182 to plate 138 of the output tube 136 in the recording amplifier RP.

Further, the closing of contact 183 of the energized relay 165 puts grounds on a conductor 184 which goes to the cathode 185 of input tube 135 in the recording amplifier. At the same time, the opening of back contact 186 of relay 165 removes ground from a conductor 187 which goes to the cathode 188 of output tube 140 in the transmitting amplifier TP. Relay 165 locks through its closed front contact 189 which connects with bus bar B through wires 190 and 191 by way of a normally closed relay contact 192.

It is clear from what has been said that the mere closing of the start switch 160 in response to the operation of buzzer 155 from the main office automatically places the patron's machine in condition to record. The closing of switch 160 cuts out the buzzer by opening the contact 159 and the closing of switch contact 163 completes the energizing circuit of transformer 129 in the power unit PW. At the same time, the synchronous motor 122 is started to operate the drum 120, but the circuit of the stylus motor 123 is not closed until a heater relay 193 is operated. This relay is connected by a wire 194 to the cathode 195 of output tube 136 in the recording amplifier RP.

When the recorder tube 136 has heated sufficiently to draw current across the plate-cathode path, the relay 193 is energized and closes its front contact 196. The circuit of stylus motor 123 is now closed from bus bar A, wire 156, through closed contact 154 of energized relay 151, wire 157 to junction 197, wire 198, closed relay contact 196, through the windings of motor 123, wire 199 and through the closed switch contact 163 to bus bar B. The relay 193 will operate in about twelve seconds after the start switch 160 is closed. The purpose of this delay is to provide a shunt around the phasing commutator 124 by keeping the contact 153 grounded until the recording amplifier is ready for use. In this way we prevent the start of transmission until the amplifier RP is in its operative condition.

The energizing of relay 193 opens its contact 153 and thereby removes the shunt from around the commutator 124 so that the negative simplex circuit through the relay 151 is opened briefly once for each revolution. However, a condenser 200 connected across the relay 151 prevents its release during the short interruptions caused by the commutator 124. The effect of these circuit interruptions is to phase the transmitter drum at the main office. To understand this, we have to go to Figs. 2 and 3.

It will be recalled (to review briefly the initial operations at the main office) that when the central operator pressed the call button 16 after plugging a transmitter into the patron's line jack 13, negative potential was placed on the simplex line L1—L2 from the battery source 117 through relay 104. At the patron's machine, this negative potential operated the line relay 151, going to ground through the closed contact 153 of relay 193 (then unenergized). When the central operator released the call button, the negative potential on line L1—L2 was momentarily changed to positive and the relay 92 was energized from the positive battery lead 78 through the tube 90 at the moment it fired. The closing of relay contact 118 again caused negative battery to be impressed on line L1—L2, this time through relay 70, which was thereby energized. The patron's buzzer continued to sound until he closed his start switch.

Now, when the relay 193 at the patron's machine is energized and causes the commutator 124 to open the negative simplex circuit periodically on line L1—L2, the relay 70 at the main office (Fig. 3) starts to pulse in synchronism with the patron's drum 120. At each release, the relay 70 opens its contact 119 and removes ground from relay 82, but this relay is slow to release and therefore remains energized during the momentary interruptions of the circuit of relay 70. Sparking at the relay contact 119 is prevented by grounding the pulsating tongue 119′ through a condenser 200′.

The energized relay 82 opens its back contact 81 and breaks the circuit of the left coil 76*a* of relay 76. This relay does not release, however, because the circuit of its other coil 76*b* is now completed through its own contact 85 and the closed contact 119 of the pulsing relay 70 during the energized periods of the latter. At the next break of the simplex circuit by the patron's commutator 124, the relay 70 momentarily releases and opens its contact 119, thereby causing the relay 76 to release. The closed contact 86 of relay 76 closes the circuit of phase magnet 39 from the positive battery lead 78, wire 201, through the magnet winding, wire 202, relay contact 86 and through the closed contact 203 of the unenergized relay 116 to ground.

Let us remember that when the operator inserted the message holding drum 43 into the machine, the power relay 52 was operated and energized the drum motor 36, the chopper motor 37 and the exciter lamp 31. At the same time the magnet 38 was released to allow the half-nut 33 to connect with the feed screw 35. However, the drum 43 was still held stationary by the locked clutch 40. Now, when the phase magnet 39 is energized, it releases the clutch 40 and causes the drum 43 to rotate in phase with the patron's drum 120. With the scanning carriage SK starting to move down, the scanning of the message on the transmitter now begins. The facsimile signals transmitted over the line L1—L2 are recorded on the patron's machine by the stylus 121 in a manner well understood by electrical engineers.

The scanning process continues until the entire message on drum 43 has been scanned, whereupon either the switch 44 or the contactor 44′ will be closed, as previously explained. In either case the relay 116 will be energized from the battery lead 78, wire 204, closed contact 88 of deenergized relay 77, through the winding of relay 116, wire 204 and through the closed switch 44 (or contactor 44′) to ground. The relay 116 locks through its own closed contact 205 to ground. One result of relay 116 being energized is to break the circuit of clutch magnet 39 at the opened contact 203, thus stopping the rotation of drum 29.

The tongue 114 of energized relay 116 breaks with contact 115 and closes contact 206, whereby the simplex line L1—L2 is switched from negative to positive battery through the following circuit: from positive lead 78, wire 207, closed contact 208 of energized relay 82, through closed contacts 206 and 114 of energized relay 116, wire 113, through closed contact 118 of energized relay 92, through relay 70, wire 65, through the ring contacts 68—68′ of the plug and jack connection to center tap 73 of the H-pad 72, and from there dividing equally over the wires L1—L2.

The positive potential thus impressed on the transmission lines at the main office releases the line relay 151 at the patron's machine, whereby a relay 209 is energized through the following circuit: from bus bar B, through contact 162 of the closed start switch 160, wire 210, through the coil of relay 209, wire 211, closed contact 212 of energized relay 165, wire 213, through closed contact 214 of the released relay 151, wire 215, closed contact 175 of the unenergized relay 164, wire 171 to point 172, and by wire 156 to bus bar A. The energized relay 209 locks through its contact 216 and through a normally closed switch 217, which we call the "acknowledge" button. It should be noted here that when the relay 209 is operated its closed contact 218 maintains a ground on the positive simplex conductor 153b through the resistor 153a.

The closed contacts 219 and 219' of energized relay 209 operate the buzzer 155 through a circuit from bus bar A, wire 156 to point 220, closed contact 219, wire 157, through the buzzer winding to wire 158, through closed contact 219', and by wire 191 to bus bar B. At the same time, a lamp 221 lights through a circuit from bus bar A, wire 156 to point 172, wire 171, closed contact 175 of unenergized relay 164, wire 215, closed contact 214 of the deenergized relay 151, wire 213, closed contact 212 of energized relay 165, wire 211 to point 222, wire 223, through lamp 221 and by way of closed switch 217 and wire 161 to bus bar B. While the lamp 221 is not really necessary, it combines with the buzzer to produce a visual-aural signal to impress the attendant of the patron's machine with the fact that the message has been completed at the main office and that the machine should now be turned off.

It should be mentioned that the switch 160 is automatically shifted to "off" position by the slidable stylus carriage at the end of its path of travel. This operation is fully explained in the pending application of Ridings et al., Ser. No. 33,345, previously referred to. If the scanning of a short message is finished before the stylus carriage can complete its forward movement, the patron opens the switch 160 by hand. In either case, the operation of switch 160 to "off" position shuts off the power supply from everything except the relay 209, which remains energized to keep the buzzer 155 and lamp 221 going. The attendant now removes the recorded message from the drum and operates the "acknowledge" button 217 to open position. This breaks the circuit of relay 209 to stop the buzzer and put out the light. The release of relay 209 opens the contact 218 to remove ground from the positive simplex lead 153b and that operation has the following effect on the transmitter at the main office.

As previously explained, when the end-of-message switch 44 (or 44') was operated at the transmitter, positive battery was sent through relay 70 over the simplex leads to the rectifier stack 149—150 in the patron's machine, whereby the line relay 151 was released and the relay 209 was energized. That placed a ground at relay contact 218 on the positive terminal of rectifier 150, thus completing the circuit of the transmitter relay 70. Therefore, the removal of ground from the positive conductor 153a by the deenergizing of the patron's "acknowledge" relay 209 automatically releases the relay 70 at the main office.

The release of relay 70 breaks the circuit of coil 76b of relay 76 and releases the relay 82, so that ground is placed on coil 76a and relay 76 is restored to its normal energized condition. With relay 82 released and relay 116 still energized, the red "busy" lamp 18 goes out and the patron's white "acknowledge" lamp 17 goes on through a circuit including the closed back contact 224 of relay 82 and the closed front contact 225 of energized relay 116. The lighted lamp 17 tells the central operator that the patron has removed the blank and operated the "acknowledge" button 217. The operator will now pull out the plug 26 and remove the drum from the machine. The removal of drum 29 opens the shorting switch 47 and again energizes the relay 77, which opens all its contacts, thereby releasing the relay 116 and extinguishing the lamp 17. The energizing of relay 77 breaks the circuit of the power relay 52 at the opened contact 89, whereby the motors 36 and 37 are stopped and the magnet 38 is energized to remove the half-nut 33 from the feed screw 35. As a result, the scanning carriage SK returns to start position and the transmitter is again in condition for the next operation.

As mentioned in an earlier part of this description, if a patron should happen to start his machine as a transmitter at the same time that the operator at the main office is pressing the patron's call button 16 to send him a message (or just before that button is pressed), in that event the red "busy" lamp 18 on the concentrator panel will not go on and the operator is thereby informed that the two machines have not made connection. This condition is due to the fact that the tube 90 in the main office transmitter (Fig. 3) has not fired and accordingly the relay 92 has not operated. To understand this let us recall that when the central operator releases the call button 16, a positive potential is impressed on the starting anode 93 of tube 90 through a circuit previously traced. This positive potential causes the tube to fire and energize the relay 92, which lights the red lamp 18 to inform the operator that the connection has gone through to the patron's machine.

Now suppose the attendant of the patron's machine, intending to send a message to the main office, has closed the start switch 160 before the central operator presses the call button. The patron's relay 151 (Fig. 5) being unenergized under those conditions, the closing of switch 160 energizes the patron's relay 164 which sets the machine up as a transmitter. The relay 164 is energized from bus bar B through closed switch contact 163, wire 166, through the winding of relay 164, wire 167, through closed contact 168 of relay 193 (not energized), wire 169, through closed contact 170 of line relay 151 (not energized) and by wire 156 to bus bar A.

The energized relay 164 closes its front contact 226 which establishes a ground for the positive potential on the simplex leads L1—L2 through the following connections: from the positive terminal of rectifier 150, through resistor 153a, wire 227, closed contact 226, wire 152 and through the closed relay contact 153 to ground. This ground on the positive simplex leads prevents the positive voltage from building up high enough on the start anode 93 to fire the tube 90 at the main office, so that a connection will not be made between the patron's machine and the main office transmitter. This explains why the application of positive potential to the simplex line after the first calling signal of negative potential has gone over is an automatic test to see if the line is clear for facsimile transmission to the patron's machine.

There is yet another detail that requires explanation in the transmission operation from main office to patron according to the system as disclosed in Figs. 3 and 5. We have assumed that the transceiver scanning mechanism represented schematically in Fig. 5 by the parts 120 to 123 is like that shown in the copending application of Ridings et al., Ser. No. 33,345, filed June 16, 1948. In that case the stylus is so mounted that normally it is held in raised position and is automatically lowered into scanning position at the proper moment. In Fig. 5, the normal raised position of stylus 121 is indicated at 121'.

It takes a certain interval of time (which may vary slightly in different machines) for the stylus to move down from raised to scanning position. This movement of the stylus starts at the moment when the stylus motor 123 is energized and that moment occurs, as we have seen, when the transmitter at the main office starts scanning. It is the function of the normally closed switch 45 (Fig. 3) to short-circuit the signal output leads 64 and 66 until the scanning carriage SK has moved down a certain distance (according to the length of cam 46), and during this interval the stylus 121 in the patron's machine swings down into contact with the recording blank on the drum 120. Therefore, no signals can go over the line until the stylus 121 is in position to record. Of course, with other designs of transmitters, the shorting switch 45 may not be necessary.

*Transmission from patron's machine to main office*

We now come to the other operation of our system, namely, sending a message from the patron's machine to a recorder at the main office. From the patron's standpoint, this operation is very simple. He places the prepared copy around the drum and moves the start switch 160 to "on" position. That is all he has to do, for the machine now sets itself up automatically as a transmitter.

The closed contact 163 of switch 160 connects the power to the machine, energizing the drum motor 122 and the power supply unit PW through circuits previously traced. This time the relay 164 is energized to cut out the recording amplifier RP by opening its contact 173′ which is connected to the grid 127 of tube 135, but the output tube 136 of this amplifier is energized from the power unit PW for the control of relay 193. The circuit of relay 164 goes from bus bar B through switch contact 163, wire 166, through the relay winding, wire 167, contact 168 of relay 193 (not energized), wire 169, through closed contact 170 of relay 151 (not energized) and by wire 156 to bus bar A. Relay 164 locks through its contact 228 independently of relay 193.

The closing of contact 173 of the energized relay 164 connects the coil 146 of line transformer 144 to the transmitting amplifier TP, and the closed contact 226 of this relay places a ground through wire 227 on the positive side of the simplex circuit L1—L2. This is important to remember. It should also be noted that the recording relay 165 is not energized, whereby the cathode lead 184 remains open and the recording amplifier RP is kept out of service. The stylus 121 is now connected to the bridge circuit 142 of amplifier TP by way of wire 181, closed contact 178 of relay 165 and wire 180. However, at this moment the stylus 121 is still in its normal raised position 121′ because the stylus motor 123 is not yet operating.

So far, then, the drum 120 is rotating at synchronous speed, the transmitting amplified TP is in operative condition, but the scanning of the message has not yet begun. We now go to the main office and see what happened when the patron closed his start switch.

Referring to Fig. 7, the rectangle 230 may be assumed to represent a facsimile recorder of the continuous paper feed type like that disclosed in the pending application of Hallden and Zabriskie, Serial No. 83,333, filed March 25, 1949. For the purposes of this description, we have shown in symbolic form only such parts as are needed to explain the operation of our system. There is a flat stationary platen 231 over which the recording paper 232 is continuously moved from a supply roll 233 by a feed roller 234 operated by a motor 235. A stylus 236 mounted on a belt 237 is driven rapidly in a straight line across the slowly moving paper by a motor 238. The connection between the stylus belt 237 and motor 238 are such that the belt is not operated until a stop disk 239 is released by a magnet 240 when the latter is energized and moves its armature 241 away from the disk. For the present that is all we have to know about the recorder 230 at the main office.

In Fig. 6, the line connections that go to the patron's jack 13 are the same as those in Fig. 2, previously described, so the same reference numerals are used for the corresponding parts in the two drawings. As already explained, normally there is a positive standby potential on the simplex line L1—L2 from battery 75 through relay 74 and the ring 68′ of jack 13, but this circuit is normally open at the patron's machine. Now when the patron closes his switch 160 to send a message, the closed contact 226 of energized relay 164 (Fig. 5) puts a ground on the positive simplex line L1—L2 through the center tap wire 148, rectifier 150, wire 152 and grounded contact 153, whereby the circuit of relay 74 at the main office is closed. The energized relay 74 closes its contacts 242 and 243 with the following result.

Referring to Fig. 6, the closing of contact 242 lights the lamp 14 that appears directly over the patron's jack 13 on the concentrator panel (see Fig. 1). The closed contact 243 energizes a large signal light 244 which is common to all the patrons' machines and is preferably placed in a conspicuous position on the concentrator panel 12 (Fig. 1). If the operator happens to be away from the panel when a patron sends in a call, the light 244 will attract her attention. We may also add a buzzer 245 which sounds when the lamp 244 goes on. For this purpose, we provide a relay 246 which operates when the energized line relay 74 closes its contact 243. The closed contact 247 of energized relay 246 completes the circuit of buzzer 245 if the hand switch 248 has been closed. By opening this switch the buzzer is cut out of use.

The main office operator, seeing the light 14 over the patron's jack 13, plugs in a recorder and presses the start button 19 associated with that particular machine. When the plug 27 is inserted in the jack, the standby positive potential over the line through relay 74 is disconnected at the opened ring contact 68′ of the jack, and the relay 74 is deenergized so that the lamp 14 goes out. The operation of start button 19 energizes a relay 250 (Fig. 7) from positive battery source 251 through normally closed switch contacts 252—253, wire 254, through the winding of relay 250, start button 19, wire 255, to ring contact 256 of the inserted plug 27, and by way of the ring normal 68′ of jack 13 and H-pad 72 over the simplex line L1-L2 to the patron's machine. Here (Fig. 5) the positive simplex goes over line 148 through the rectifier 150, resistor 153*a*, wire 227, and by way of the closed relay contacts 226 and 153 to ground.

At this time the patron's relay 193 (Fig. 5) is not yet energized because its circuit goes through the tube 136 which takes about ten to twelve seconds to heat, as previously mentioned. When the relay 193 operates, the ground at its contact 153 is lifted and now the circuit of relay 250 at the main office recorder goes to ground by way of the patron's rotating commutator 124. Therefore, at each revolution of the patron's drum 120, the circuit of relay 250 is momentarily opened, so that this relay pulses in synchronism with the speed of the distant transceiver drum.

Returning again to Figs. 6 and 7, when the relay 250 is energized, its closed contacts 257 will cause the operation of a relay 258 from positive battery 259, wire 260, through the coil of relay 258, wires 261 and 262, through relay contacts 257, and by wire 263 to the grounded conductor 264. The relay 258 is slow to release and will therefore stay energized during the momentary interruptions in the pulsing circuit of relay 250. The closed contacts 265 of relay 258 cause the power relay 266 to be energized from battery 259, wire 260, through the coil of relay 266, wire 267, and through contacts 265 to the grounded conductor 264. The closed contacts 268 of relay 258 short out the start button 19, so that, when the button is released, the positive simplex circuit through relay 250 remains closed.

The energized power relay 266 closes its contacts 266′ which light the red "busy" lamp 21 and connect the power mains A and B to a recording amplifier RM. Since this amplifier does not by itself constitute a part of our invention, it is sufficient to show it merely in schematic form with a power input transformer 269 which is connected by leads 270 and 271 to the power source A—B and supplies current to the tubes in the amplifier when the relay 266 is energized. The signal input leads 272—273 of the amplifier go through an adjustable T-pad 274 to the tip 275 and sleeve 276, respectively, of the inserted recorder plug 27. The amplified signal output of the amplifier goes through lines 277 to the primary coil 278 of a transformer 279, whose other coil 280 is connected at one side by a wire 281 to the recording stylus 236. The other side of coil 280 is grounded. The output leads 277 are normally short-circuited by wires 277′ which go to normally closed relay contacts 282.

The closing of relay switch 266′ also energizes the stylus motor 238 from bus bar B, wire 282′, through the motor windings, wire 283, and through switch 266′ to bus bar A. However, the stylus belt 237 is not yet moving because the stop disk 239 is held locked by the armature 241 of the unenergized magnet 240.

When the energized relay 258 opens its back contact 284, it removes one ground from the right-hand coil of a two-coil relay 285, which is normally energized from battery 259, through wire 286 and the closed contact 284 which goes to ground through the tongue 284′ before the relay 258 is energized. The opening of relay contact 284 does not, however, release the relay 285 because at this time there is another ground on the right hand coil from wire 286, through the closed contact 287 of a normally energized relay 288, and by wire 263 to the grounded conductor 264. Besides, the second or left-hand coil of relay 285 receives battery from source 259 through its own closed contact 289, wire 290, closed contacts 291—292 of energized relay 250 (not yet pulsing), then to conductor 293, closed contacts 294 of relay 285, wire 295, closed contacts 296 of a relay 297 (not energized) and by wire 298 to ground at 299. The relay 297 is of the slow release type and its function will presently appear.

We are to remember, then, that the normally energized relay 285 has remained energized so far (that is, before the relay 250 starts pulsing from the patron's commutator 124), even when the contact 284 of the energized relay 258 is opened. The closing of contact 300 of relay 258 by the grounded tongue 284′ places a shunt across the coil of relay 288, which is normally energized from battery source 301 and through wire 263 to the grounded line 264. Being thus shorted out, the relay 288 is deenergized, but it is slow to release and after about one second it opens its contacts 287, thereby removing the second ground from the right-hand coil of relay 285 and thus causing that coil to become deenergized.

The relay 285 is now energized only by the left-hand coil and is thus in a condition to release as soon as the relay 250 starts pulsing. That happens after the patron's relay 193 (Fig. 5) has operated and removed the shunt from around the commutator 124. Therefore, when the next revolution of the commutator opens the positive simplex circuit through relay 250 as previously described, this relay will momentarily release and open its contacts 291—292. This breaks the circuit of the second or left-hand coil of relay 285, which thereupon releases and through its opened contacts 289 it breaks the circuit to contact 291 of relay 250. Consequently, the further pulsing of relay 250 will not affect the released relay 285.

The release of relay 285 causes several automatic operations to take place. The opened contacts 282 remove the short circuit 277′ from the output leads 277 of the recording amplifier, so that the received signals now can go through the transformer 279 to the recording stylus 236. The closed relay contacts 302 complete the circuit of the paper feed motor 235 from bus bar A, closed relay switch 266′, wire 283, through relay contacts 302, wire 304, and through the motor windings to bus bar B. The closed contacts 305 of released relay 285 complete the circuit of phase magnet 240 from battery 259 whereby the armature 241 releases the stop disk 239, and the stylus belt 237 is now driven by the motor 238, which was energized upon the closing of relay switch 266′. The operation of armature 241 moves the adjacent switch arm 253 against a contact 306 which is connected to a source of negative potential 307. The simplex circuit through relay 250 is now changed from positive to negative.

At the patron's machine (Fig. 5) this pulsating negative potential on the line operates the relay 151, which is prevented by the condenser 200 from releasing when the circuit is briefly interrupted by the commutator 124. The closing of relay contact 154 completes the circuit through the stylus motor 123 from bus bar A, wire 156, closed contact 154 of energized relay 151, wires 157 and 198, closed contact 196 of the energized relay 193 through the motor windings, wire 199, and through contact 163 of the closed start switch 160 to bus bar B. Thus, the scanning process is started at the patron's machine and continues until the stylus has scanned the entire message, whereupon the switch 160 is automatically moved back to "off" position. This automatic opening of switch 160 is fully described in the pending application of Ridings et al., Serial No. 33,345, previously mentioned.

During the scanning of the patron's message by stylus 121, the facsimile signals produced by the contact of the stylus on the rotating message blank in a manner well known are impressed on the grid 143 of the input tube 139 in the transmitting amplifier TP. This circuit goes from stylus 121 through wire 181, closed contact 178 of relay 165 (not energized), wire 180, and through the bridge network 142 to grid 143. The amplified signals are impressed on the transmission lines L1—L2 through the transformer 144. Let it be noted that during transmission of the patron's message the negative potential remains on the simplex line without interfering with the facsimile signals.

At the main office (Fig. 6) the received facsimile signals pass through the tip 275 and sleeve 276 of plug 27 over lines 272 and 273 into the recording amplifier RM. The amplified signal output goes over the leads 277 through transformer 279 to the recording stylus 236 (Fig. 7) which records the message line by line on the slowly moving paper 232. This electric recording process on specially prepared paper is well understood and requires no explanation here.

When the transmission on the patron's machine ends by the opening of switch 160 (Fig. 5), the power is disconnected so that all relays are released and the drum 120 stops. The release of relay 164 opens the contact 226 and thereby disconnects the positive simplex lead 227. The stopped commutator 124 ceases to interrupt the simplex circuit and causes the relay 250 at the main office (Fig. 7) to remain energized without pulsing. Under these conditions the contact 308 of relay 250 remains open and this contact is connected by wire 295, closed contact 296 of relay 297 (not energized) and wire 298 to the control grid 309 of a vacuum tube 310, which is shown as a pentode. The plate 311 and screen grid 312 of this tube are connected to the opposite sides of the slow-release relay 297. The circuit of control grid 309 contains a condenser 313 and a resistor 314, which go to ground at 299. The filament of the tube 310 is heated by a transformer 315 connected to the bus bars A—B.

The left side of relay 297 and screen grid 312 are connected by a wire 319 to a source of positive potential 320 through a normally closed switch 321, but the relay circuit is not closed until the tube 310 draws current. This tube can not fire as long as the control grid 309 is connected to negative potential from a battery terminal 322. This negative potential is impressed on grid 309 through either one of two paths from the negative lead 293 to wire 295. One path goes through the closed contact 308 of relay 250 when the latter is not energized and the other path goes through the closed contact 294 of relay 285 when the same is energized, as it normally is. Both of those negative potential paths go through the closed contact 296 of relay 297 when the same is not energized.

Since the two-coil relay 285 became deenergized just before the patron's machine started to transmit, the only path for the negative potential to reach the grid 309 of tube 310 goes through the contact 308 of relay 250 which pulses continuously during transmission. However, the opening of contact 308 during the energized periods of the pulsing relay 250 is too brief to cause removal of the negative potential from the grid 309 because the condenser 313, which is charged during the release of relay 250, keeps negative potential on the grid whenever the pulsing relay opens its contact 308. Therefore, the tube 310 is kept from firing during the transmission period and thus the relay 297 remains unenergized.

However, when the relay 250 stops pulsing and stays energized at the close of transmission from the patron's machine, the contact 308 remains open long enough (less than two seconds is sufficient in our present installation) to remove the negative potential from grid 309. Instantly the tube 310 fires and relay 297 is energized, thereby opening its back contact 296 and closing its front contacts 317 and 318, both of which when closed are connected to the grounded conductor 264.

The operation of the end-of-message relay 297 at the main office recorder has the following results. The closing of contact 317 places a ground on the right-hand coil of relay 285, which is now energized from battery lead 259. The energized coil 285 opens its contacts 305 and breaks the circuit of phase magnet 240, which releases its armature 241, thereby locking the disk 239 and connecting the switch member 253 to the positive battery terminal 251. At the same time the opened relay contacts 302 stop the paper feed motor 235.

It will be recalled that when the relay 164 at the patron's machine (Fig. 5) was released at the end of the transmission, the positive simplex lead 227 was opened at relay contact 226. Consequently, when the deenergized phase magnet 240 at the main office (Fig. 7) released its armature 241 and reversed the simplex potential from negative to positive, the simplex current through relay 250 dropped to zero, so that this relay now releases. Its open contact 257 releases the relay 258, which opens its contact 300 and thereby causes the relay 288 to resume its normal energized condition. The opened contact 265 of relay 258 breaks the circuit of power relay 266, causing the switch 266′ to open. The red "busy" lamp 21 is now extinguished and the end-of-message lamp 20 is lighted from the battery terminal 320 through a normally closed switch 321, wires 319 and 322, through the lamp to wire 323, closed contact 324 of the deenergized relay 258, and through closed contact 318 of energized relay 297 to the grounded connection 264.

When the end-of-message lamp 20 lights, it indicates to the operator that the patron's machine has shut down and that the plug 27 should now be pulled out. In the particular form of recorder shown diagrammatically in Fig. 7 there is a cam disk 325 which the operator turns by hand to feed out the correct length of recorded paper from the platen 231. This is done during one turn of the cam disk 325, as fully explained in the pending application of Hallden and Zabriskie, Serial No. 83,333, to which we have previously referred. For the present description we need only mention that when the operator has fed the recorded message out of the machine on a predetermined length of paper, the cam disk 325 opens the switch 321. This releases the end-of-message relay 297 and extinguishes the lamp 20. The recorder is now in standby condition for the next operation.

Broadly speaking, the tube 310 operates as a pulse detector at the main office end of our system to indicate whether a patron's connected machine is running. As long as the patron's drum is rotating, the commutator 124 keeps the relay 250 in the main office recorder pulsing. And, as we have seen, the pulsing of relay 250 prevents the operation of tube 310, so that the relay 297 remains unenergized and the lamp 20 stays unlighted. Therefore, the unlighted lamp 20 acts as a signal to the operator that the patron's drum is running. Now, when the patron's drum stops rotating for any reason (as at the end of a message or due to a breakdown), the relay 250 stops pulsing, the tube 311 draws current and energizes the relay 297, which lights the lamp 20 as a signal that the patron's machine has shut down.

*Synopsis of operation when main office transmits to patron*

In view of the long description required to explain the operation of our system in detail, we shall summarize the essential events that take place in order to afford a quick review of our invention.

First, the transmission of a message from the main office to a patron (Figs. 2-3 and Figs. 4-5). The message is placed on the drum 29 which is then inserted into the transmitter. This automatically closes the switch 47 and shorts out the relay 77 (normally energized), thereby causing the power relay 52 to operate. Power from the bus bars A—B is now connected to the regulator-inverter RV, the energized half-nut magnet 38 is released, and the drum motor 36, the chopper motor 37, and the exciter lamp 31 are all energized. The drum 29 is not yet rotating because the disk 40 is still locked.

The operator now plugs the transmitter into the patron's jack and presses the call button 16 associated with the connected transmitter. This places negative calling battery on lines L1-L2 while the button is briefly held down. When the button is released, the negative potential on the line is momentarily changed to a positive testing potential which operates the relay 92 through tube 90 and lights the red "busy" lamp 18 after connection with the patron's machine has been established. The energized relay 92 changes the positive potential back to negative on the simplex line, and this negative potential goes through relay 70 which is thereby energized.

At the patron's machine this negative potential operates a relay 151 and sounds the buzzer 155. The patron places a sheet of recording paper on his drum and closes the start switch 160. This connects power to the machine and automatically sets it up as a recorder by energizing the relay 165 and the recording amplifier RP. The drum motor 122 is started, but the stylus 121 is held inoperative for several seconds until the heater relay 193 is energized. The stylus motor 123 is now started and the commutator 124 causes the negative simplex circuit on the line to be opened briefly for each revolution of the drum shaft. The patron's machine is now ready to receive.

At the main office transmitter, the interrupted simplex causes relay 70 to pulse and the next break in this circuit will release the energized phasing relay 76. As a result, the phase magnet 39 is energized to release the disk 40, whereby the transmitting drum 29 rotates in phase with the patron's drum 120 which records the received message.

After the entire message has been scanned at the main office, relay 116 is energized by the automatic closing of switch 44 and positive battery is now applied through relay 70 to the simplex line. The operation of relay 116 opens the circuit of phase magnet 39, whereby the disk 40 is again locked to stop rotation of the transmitter drum 29.

At the patron's machine, the positive potential on the simplex line releases the relay 151, causing relay 209 to operate. This sounds the buzzer 155 and lights the lamp 221 to let the patron know that the message has been completed at the main office. The patron will now open the start switch 160, remove the recorded message, and press the button 217 to acknowledge receipt of the message. The operation of button 217 deenergizes the relay 209, which thereby removes ground from the positive simplex lead that goes through the rectifier 150. The machine is now entirely shut down and ready for the next operation, either for receiving or transmitting.

At the main office, the removal of ground from the positive simplex lead by the operation of the patron's "acknowledge" button 217 causes the relay 70 to release with the result that relay 76 is again energized and relay 82 is released. This extinguishes the red "busy" lamp 18 and lights the white lamp 17 to advise the operator that the patron has removed the recorded message and operated the "acknowledge" button. The operator now pulls out the plug and removes the drum 29 from the transmitter. Removal of the drum opens the switch 47 and again energizes the relay 77, which releases the end-of-message relay 116 and puts out the lamp 17. At the same time the power relay 52 is released and stops the motors 36 and 37, while the half-nut magnet 38 is energized to release the scanning carriage for return to start position.

Should the patron, after receiving the signals 155 and 221, fail to operate the "acknowledge" button 217 within a reasonable time, the supervisor at the main office can release the patron's relay 209 and turn off the signals by pressing the call button 16. This applies negative battery to the line, as previously explained, and energizes the patron's relay 151, which breaks the circuit of relay 209 and completely shuts down the patron's machine.

*Synopsis of operation when patron transmits to main office*

After mounting the message on his drum the patron closes the start switch 160. This connects power to the transmitting amplifier TP. The drum motor 122 starts rotating and the relay 164 is energized. This automatically sets the machine up as a transmitter by connecting the stylus 121 to the input of the amplifier TP and connecting the amplifier output to the line transformer 144. The stylus 121 remains in normal raised position 121' because the stylus motor 123 has not yet been energized. The operation of relay 164 places a continuous ground on the positive simplex conductor 227 through relay contact 153.

At the main office (Figs. 6-7), the ground thus placed on the positive simplex lead completes the circuit from positive battery 75 through the line relay 74, which lights the lamp 14 over the jack of the calling patron. Seeing this light, the operator plugs in a recorder and presses the start button 19, whereby the relay 74 is released to extinguish the lamp and the relay 250 is energized from positive battery which goes over the lines L1—L2. The energized relay 250 causes relay 258 to be energized and this operates the relay 266 which connects the power to recording amplifier RM and starts the stylus motor 238. However, the stylus belt 237 is not yet running.

At the patron's machine, the heater relay 193 is operated after several seconds and connects ground to the positive simplex circuit through the rotating commutator 124, whereby the simplex circuit is momentarily opened at each revolution of the patron's drum.

At the main office, the relay 250 will now pulse in response to the opening of the simplex circuit by the patron's commutator. When the pulsing relay 250 releases during the first break in the simplex circuit, the normally energized relay 285 releases to operate the paper feed motor 235 and the phase magnet 240. The energized phase magnet releases the stylus belt 237 for operation by motor 238 and at the same time reverses the simplex potential from positive to negative. This negative potential remains on the line during the transmission cycle.

At the patron's machine, the negative simplex potential operates the line relay 151, which completes the circuit through the stylus motor 123, whereby the stylus 121 is moved into scanning contact with the message on the drum. The scanning process now begins at the patron's machine and the transmitted signals are recorded at the main office. When the entire message has been scanned, the patron's switch 160 is automatically moved to "off" position, whereby all power is disconnected and the machine is shut down, except that the line relay 151 remains energized by the negative potential on the line.

At the main office, when the patron's commutator ceases to interrupt the simplex circuit, the relay 250 remains continuously energized and causes the operation of relay 297. This deenergizes the phase magnet 240 and changes the simplex potential from negative to positive, thereby releasing the patron's relay 151 and the relay 250 at the main office. The release of relay 250 deenergizes the relay 258, which in turn causes the operation of relay 257 and the release of power relay 266. The red "busy" lamp 19 is now extinguished and the end-of-message lamp 20 goes on. The operator now unplugs the recorder and pulls out the correct length of paper from the machine, thereby opening the switch 321. This releases the relay 297 and puts out the lamp 20.

In this description of our invention we have referred to certain constructions of transmitter, recorder and transceiver as disclosed in the copending applications herein identified. However, it is to be understood that our two-way facsimile system is not limited to any particular construction of machine either at the main office or in the patrons' offices. It is only necessary that the machines used are capable of operating with the novel circuit controls embodied in our invention as described in the appended claims.

It goes without saying that the drawings represent only one form of our invention, which is capable of various changes and modifications within the scope of our claims. For brevity and clearness in the claims we have used the terms "positive battery" and "negative battery" in the broad meaning of "battery of one polarity" and "battery of the opposite polarity." As previously stated, where we now use negative battery we can use positive, and vice versa, so that these polarity terms are to be regarded as interchangeable both in the description and the claims. Obviously, by the term "battery" we include any suitable source of direct current potential. Also, when we speak of a call button or start button in the claims, we mean any practical form of hand switch for the operator at the main office, thereby avoiding confusion in the claims between the patron's start switch and the switches at the main office.

The specific circuits and apparatus that we have shown and described represent a practical embodiment of our system as actually built and operated. This does not mean, however, that our invention is restricted to the details set forth, for the scope of our invention as defined in the claims herein comprehends various changes and modifications that may be resorted to by those skilled in the art.

We claim as our invention:

1. A two-way facsimile telegraph system comprising a transmitter and a recorder at a central telegraph office, a distant transceiver constructed to transmit and to record messages, a pair of lines connecting said transceiver to switch terminals at the central office, means for connecting said transmitter to said switch terminals and other means for connecting said recorder to said terminals, relay controlled circuits responsive to the connecting of said recorder to said switch terminals for automatically placing the recorder in communication with said transceiver to record the facsimile signals transmitted by the transceiver, and relay controlled circuits responsive to the connecting of said transmitter with said switch terminals for automatically placing the transceiver in condition to record the facsimile signals transmitted by the connected transmitter.

2. A two-way facsimile telegraph system comprising a transmitter and a recorder at a central telegraph office, each of said machines having a connecting plug and a start button, a patron's transceiver constructed to transmit and to record messages, a start switch for said transceiver, a communication line for connecting said transceiver with a jack at the central office, means whereby the insertion of the transmitter plug into said jack and the closing of the transmitter button when the transceiver switch is off automatically conditions the system to transmit a message from the central transmitter to the patron's machine upon the closing of the transceiver switch, and means whereby the insertion of recorder plug into said jack and the closing of the recorder button after the closing of the transceiver switch automatically conditions the system to transmit a message from the patron's machine to the central recorder.

3. In a two-way facsimile telegraph system between a central telegraph office and a distant transceiver constructed to transmit as well as receive messages, a transmitter and a recorder at the central office, a communication line connecting the transceiver with a jack at central office, said transmitter and recorder having each a plug for insertion in said jack, a start switch for said transceiver, means at central for placing battery on the line, a relay in said transceiver connected to be energized by the line battery when either plug is inserted in the jack, circuit connections whereby the transceiver sets itself up as a recorder when said relay is energized by insertion of the transmitter plug before said switch is closed, and other circuit connections which cause the transceiver to set itself up as a transmitter upon the closing of said switch provided said relay is then in unenergized condition.

4. A facsimile telegraph system comprising a patron's transmitter and a recorder located at a main telegraph office, a communication line between said transmitter and a jack at the main office, a start switch for said transmitter, a start button and a connecting plug for said recorder, means at the main office for normally keeping positive battery on the line through said jack, a relay at the transmitter adapted to keep said line battery normally open, means for energizing said relay when the transmitter switch is closed, said energized relay closing the circuit of said line battery, a call signal at the main office energized by said closed battery circuit, means whereby the insertion of the recorder plug in said jack and the operation of the recorder button automatically places the recorder in operative condition and puts negative battery on the line, and means at said transmitter for causing the negative battery to start scanning operation of the transmitter.

5. In a two-way facsimile telegraph system, a facsimile machine having control apparatus which includes a first relay normally energized to hold the machine inoperative, a second relay in said apparatus normally unenergized, a distant transceiver adapted to be operatively connected with said machine through a communication line, the scanning mechanism of said transceiver including a rotary drum, means for initially placing steady battery on the line through said second relay, control circuits at said transceiver for causing the second relay to pulse in synchronism with said drum, means for causing the pulsations of the second relay to effect the release of said first relay, and devices responsive to the release of said first relay for starting said machine in phase with the transceiver.

6. In a two-way facsimile telegraph system, a transceiver capable of transmitting and recording messages, the scanning mechanism of said transceiver including a rotary drum, a transmitting amplifier and a recording amplifier for said transceiver, means whereby only one amplifier at a time is operatively connected, a relay connected in a cathode circuit of one of said amplifiers whereby said relay is not energized until the connected amplifier is in operative condition, a facsimile machine located at a main telegraph office and adapted to be operatively connected to said transceiver, control apparatus for said main office machine including a relay, means responsive to the timed energizing of said transceiver relay for causing said main office relay to pulse synchronously with the speed of the transceiver drum, and means whereby the pulsations of said last mentioned relay phase the main office machine with said transceiver.

7. In a facsimile telegraph system, a main office transmitter and a patron's recorder adapted to be operatively connected through a communication line, means at the transmitter for sending negative battery over the line before the transmitting operation starts, a call signal at the recorder operated by said negative battery, a start switch for said recorder, means for stopping said signal and turning the power on when said switch is closed, electric circuits operating in response to the closing of said switch for starting the scanning operation of said transmitter, means at the transmitter for automatically placing positive battery on the line at the close of the scanning operation, and means at the recorder for causing said positive battery to operate said signal as an indication that the facsimile transmission is complete.

8. In a facsimile telegraph system, a patron's facsimile machine for transmitting messages to a main telegraph office, a recorder at said office, switch means for connecting said recorder to the patron's transmitter over a pair of wires, means for automatically placing positive battery on said wires in response to the operation of said switch means, a relay in said recorder energized by the positive battery, means at the patron's machine for causing said relay to pulse at a predetermined rate in the positive battery circuit, apparatus in said recorder controlled by the energized periods of said pulsing relay to connect power to the recorder, other apparatus in said recorder controlled by the deenergized periods of said pulsing relay to phase the recorder and change the positive battery to negative battery on the line, and mechanism at the patron's machine utilizing said negative battery to start the transmission.

9. In a facsimile telegraph system, a transmitter having means for removably supporting a scanning drum, a movable scanning carriage operatively associated with said drum, a relay normally energized to keep the power off the machine, means responsive to the presence of a drum in the transmitter for releasing said relay, a power circuit energized by the release of said relay, a normally energized magnet released by the deenergizing of said relay to condition the scanning carriage for operation, a normally deenergized magnet for holding said carriage against movement, a distant receiver having equipment for connecting it to said transmitter, a start switch at the receiver, recording apparatus in the receiver energized by the closing of said switch, and apparatus at the transmitter controlled by the closing of said receiver switch for energizing the second magnet to release said carriage for scanning.

10. In a facsimile telegraph system, a transmitter at a main telegraph office having a plug to be inserted in a jack, a call button and a signal lamp associated with said transmitter, a circuit for energizing said lamp, a patron's transceiver normally in receiving condition, a start switch for said transceiver, a relay in said transceiver energized by the closing of said switch to set up the transceiver as a transmitter, means whereby the energized condition of said relay when the call button at the main office is operated prevents the energizing of said signal circuit as an indication that the patron's machine is in transmitting condition and incapable of receiving a message, and apparatus in said transmitter automatically operative when the transceiver is in receiving condition upon insertion of said plug and the operation of said call button to place the main-office transmitter in condition to transmit a message to the patron's machine, said apparatus including means to light said lamp as an indication that the two machines are operatively connected.

11. In a facsimile system, a transmitter provided with scanning mechanism which includes a rotary drum, a distant receiver adapted to be operatively connected with said transmitter through a communication line, said receiver having recording mechanism which includes a rotary drum, a start switch and a call signal for said receiver, means at the transmitter for placing battery on the line, a relay at the transmitter energized by said battery, a relay at the receiver also energized by said battery to operate said call signal, means whereby the closing of said switch operates the receiver drum and causes said transmitter relay to pulse in synchronism with said drum, and apparatus at the transmitter responsive to said pulsing relay for starting the transmitter drum in phase with the receiver drum.

12. In a facsimile telegraph system, a transmitter at a main telegraph office for sending messages to a patron's transceiver over a pair of wires, a call button at the transmitter, means for sending negative battery over the wires while the button is held down, circuit connections whereby positive battery is momentarily applied to the wires when the button is released, a normally open ground at the transceiver for holding said positive line battery inoperative if the transceiver is in condition to record, means at the transmitter for changing the momentary positive battery on the line back to negative, a signal at the transceiver operated in response to said negative battery, a switch at the transceiver operated in answer to said signal for turning the power on, a relay at the transmitter energized by said negative battery, means at the transceiver for causing said relay to pulse at a predetermined rate when said switch is closed, a normally energized relay at the transmitter, means whereby said pulsing relay causes said last mentioned relay to release and means responsive to said released relay to start the transmitting operation.

13. In a facsimile telegraph system, a patron's transceiver equipped to be operatively connected with a facsimile machine at a main telegraph office, a normally inert relay at the transceiver, means whereby said relay is automatically energized at the close of a message transmission from the main office machine, a hand switch at the transceiver for releasing said relay after transmission as an acknowledgment of the receipt of the message, a signal at the main office operated in response to the release of said relay by said switch, and manually controlled means at the main office for releasing said relay independently of said switch.

14. In a facsimile system, a patron's transceiver equipped to be operatively connected with a facsimile machine at a main telegraph office, a relay at the transceiver energized during transmission and automatically released at the close of a message transmission, a second relay at the transceiver normally inert and automatically energized upon release of said first relay, a signal at the transceiver operated by the energized second relay, a hand switch at the transceiver for deenergizing the second relay after a transmission as an acknowledgment of the receipt of the message, a signal at the main office operated in response to the deenergizing of the second relay, and manually controlled means at the main office for releasing the second relay independently of said switch to stop said transceiver signal.

15. In a facsimile system, a first machine and a second machine equipped to be operatively connected for facsimile communication, one of said machines being a transmitter and the other a recorder, the first machine having scanning mechanism which includes a rotary member, a relay at the second machine, means whereby the operation of said rotary member causes said relay to pulse and the stopping of said member stops the relay from pulsing, a timing device in the second machine, circuit connections whereby the pulsing of said relay prevents said device from operating, means operable upon the cessation of pulses in said relay for causing said device to operate, and a signal energized in response to the operation of said device to indicate the stopping of said rotary member.

16. In a facsimile system, a first machine and a second machine equipped to be operatively connected for facsimile communication, one of said machines being a transmitter and the other a recorder, the first machine having scanning mechanism which includes a rotary member, a relay at the second machine, means whereby the operation of said rotary member causes said relay to pulse in synchronism with the speed of said member, said relay remaining energized steadily when said member stops rotating, a vacuum tube at the second machine, circuit connections for maintaining a negative potential on the grid of said tube to prevent its operation as long as said relay keeps pulsing, said circuit connections including contact means controlled by said relay for removing the negative potential from said grid when the relay remains energized for a certain period, whereupon the plate circuit of said tube is closed, and signal means controlled by said plate circuit to indicate the stopping of said rotary member.

17. In a facsimile telegraph system between a main office and a patron's transceiver over a two-way communication line, a start switch at the transceiver which normally is in receiving condition to record messages from the main office, a call button at the main office, apparatus including a timing device automatically controlled by the pressing and release of said call button for first applying a negative calling potential on the line, then briefly applying a positive testing potential and then restoring said negative potential to connect the main office transmitter with the transceiver, and means whereby said positive potential prevents connection of the main office transmitter with the patron's machine if said start switch has been closed to start the transceiver as a transmitter before said call button is pressed.

18. In a facsimile telegraph system having a two-way communication line, a transmitter and a recorder at a main telegraph office, a patron's transceiver provided with a start switch, means for connecting said transceiver with said transmitter for receiving messages over said line from the main office, means for connecting said transceiver with said recorder for transmitting messages over said line to the main office, a call button at the main office, means for placing negative battery on the line when the call button is pressed, timed circuit connections whereby the release of said call button automatically changes the negative battery to positive and then back to negative, means whereby said positive potential on the line prevents connection of the main office transmitter with the transceiver if the latter has already started as a transmitter when the call button is pressed, and means for causing said negative line battery to establish operative connection between said transmitter and transceiver.

19. In a facsimile telegraph system having a two-way communication line, a transmitter at a main telegraph office provided with a call button, a patron's transceiver adapted to be connected as a recorder to said transmitter for sending messages from the main office to the patron, a recorder at the main office adapted to be connected to said transceiver when the latter operates as a transmitter to send messages from the patron to the main office, means whereby pressing said call button places negative battery on the line through a slow-release relay, said call button having a contact which breaks the circuit through said relay when the button is released and thereby removes the negative battery from the line, said relay briefly holding the contact closed after its circuit is broken, circuit connections closed through said relay contact for impressing positive battery on the line after removal of the negative battery, a second relay at the main office energized by the positive line battery to place negative battery back on the line, means whereby the operation of said second relay before the operation of said start switch automatically connects the main office transmitter with the transceiver as a recorder, and means for preventing the operation of said second relay when the patron's start switch is operated before the call button is pressed.

20. In a facsimile telegraph system, a patron's transmitter and a recorder located at a main telegraph office, a communication line for connecting said two machines, means at the main office for normally keeping positive battery on the line, an open contact at the transmitter for normally holding said line battery open, a start switch for said transmitter, mechanism including a relay energized in response to the closing of said switch to place the transmitter in operative condition, said energized relay closing said contact to place ground on said battery circuit, a signal at said recorder operated by the closed battery circuit, switch means at the main office for connecting said recorder to the communication line, apparatus at said recorder automatically operated in response to the operation of said switch means for placing the recorder in condition to record, said apparatus including means for placing negative battery on the line, and means at the transmitter for causing said negative battery to start the scanning operation of said transmitter.

21. In a facsimile telegraph system between a main telegraph office and a patron's office, a transmitter in the patron's office adapted to be operatively connected with a recorder in the telegraph office through a communication line, said transmitter having transmitting mechanism which includes a rotary drum and a scanning element, a start switch for said transmitter, a call signal associated with said recorder, means for normally keeping positive battery on the line, said battery circuit being normally open at the transmitter, means whereby the closing of said start switch operates said drum and completes the battery circuit which operates said call signal, switch means for connecting said recorder to the line, a relay at the recorder energized by said positive battery, means at the transmitter whereby the operation of said drum causes said recorder relay to pulse in synchronism with the drum, circuit connections energized by said pulsing relay to turn the power on for the recorder, a normally energized relay at the recorder adapted to holding the recording mechanism inoperative, means for causing said pulsing relay to release said normally energized relay, circuit connections controlled by the release of said last mentioned relay for starting the operation of the recording mechanism and changing the line battery from positive to negative, and a relay at the transmitter energized by said negative battery to start the operation of said scanning element.

22. A facsimile telegraph system comprising a patron's transmitter and a recorder located at a main telegraph office, a communication line between said transmitter and recorder, a relay at the recorder, means for normally maintaining positive battery on the line through said relay, a rectifier unit in said transmitter connected at its central point to said line so that positive battery goes through one end of the rectifier and negative battery through the other end, said transmitter having a relay connected at one side to the negative end of said rectifier, the other side of said relay being normally grounded, a normally open ground connected to the positive end of said rectifier to keep said relay at the recorder unenergized, a start switch at the transmitter, means whereby the closing of said switch places ground on said positive battery and energizes the recorder relay, a signal operated by the energized recorder relay, manually operable switch means at the recorder for connecting the same to the communication line, control circuits responsive to the operation of said switch means for placing the recorder in condition to record and sending negative battery over the line to the patron's machine, said negative battery energizing the transmitter relay, and means controlled by said last mentioned relay to start the scanning operation of the patron's machine.

23. In a facsimile telegraph system, a main office transmitter and a patron's recorder adapted to be operatively connected through a communication line, manually operable switch means at the transmitter for connecting the same to the communication line, circuits in said transmitter responsive to the operation of said switch means for sending negative battery over the line to said recorder, a relay at the recorder energized by said negative battery, a call signal at the recorder operated by said energized relay, a start switch for said recorder, means for stopping said signal and turning the power on when said switch is closed, apparatus at the transmitter energized in response to the closing of said switch for starting the scanning operation of said transmitter, means at the transmitter automatically energized at the close of a scanning operation to replace the negative line battery with positive battery whereby said relay at the recorder is deenergized, means for causing said positive battery to operate said signal as an indication to the patron that the transmission of the message is ended, a second switch at the patron's machine to be operated at the close of said transmission, and a signal at the main office energized in response to the operation of said second switch as an indication that the patron has received the message.

24. A two-way facsimile telegraph system comprising a plurality of transmitters and a plurality of recorders at a central telegraph office, each of said machines having a connecting plug, a plurality of jacks adapted to receive said plugs, a busy lamp for each transmitter and recorder, a plurality of distant facsimile transceivers located in patrons' offices and constructed to transmit as well as receive messages, each transceiver being provided with a start switch and a call signal, a communication line connecting each transceiver with one of said jacks, a call lamp associated with each jack, so that each jack and its lamp identify a particular transceiver, a call button for each transmitter and a start button for each recorder, circuit connections for automatically lighting a patron's call lamp at the central office when the start switch of that patron's transceiver is closed to transmit a message, relay controlled circuits for automatically placing a plugged-in recorder into operative communication with a called transceiver when said recorder's start button is operated, circuit connections for automatically lighting the plugged-in recorder's busy lamp when connection with the calling transceiver has been established, means for automatically operating a transceiver's call signal when a transmitter is plugged into said transceiver's jack, relay controlled apparatus for automatically placing a plugged-in transmitter into operative communication with a called transceiver when said transceiver's call button is operated and said transceiver's start switch is closed in answer to its call signal, and circuit connections for automatically lighting the busy lamp of the plugged-in transmitter when connection with the called transceiver has been established.

25. In a two-way facsimile telegraph system, a transceiver capable of transmitting and recording messages, a distant facsimile machine equipped to be placed in communication with said transceiver, a transmitting amplifier and a recording amplifier for said transceiver, a transformer having a coil normally connected to the input of one of said amplifiers, a relay in said transceiver adapted when energized to connect said coil to the other amplifier, a second coil in said transformer connected to a pair of wires which form a communication line leading to said facsimile machine, a pair of rectifiers at said transceiver arranged in series, a connection between the center of said second coil and the center of said rectifiers so that battery applied to said wires divides in said coil and flows through said center tap connection to the rectifiers, which allow only positive battery to pass through one rectifier and only negative battery to pass through the other rectifier, means at said facsimile machine to apply negative battery to said wires, a second relay in said transceiver energized by the negative battery, apparatus in said facsimile machine automatically controlled in response to the energizing of said second relay to establish an operative relation between said transceiver and said machine, and means in said apparatus for applying positive battery to said wires at the close of a transmission to deenergize said second relay and interrupt said operative relation.

26. A two-way facsimile telegraph system comprising a transmitter and a recorder at a central telegraph office, a patron's transceiver constructed to transmit and to record messages, a communication line between the patron's machine and the central office, means at the central office for separately connecting said transmitter and recorder to said line so that either machine can be placed in communication with said transceiver, a start switch and a call signal at the transceiver, a relay in said transceiver energized by the closing of said switch, apparatus controlled by said energized relay to set up the transceiver as a transmitter, a signal lamp at the central office automatically lighted upon the closing of the transceiver switch, mechanism at the central recorder operative upon connecting the recorder to the communication line in answer to said signal lamp for automatically placing said recorder in condition to record the message transmitted by the patron's machine, means whereby the connecting of the central transmitter to the communication line automatically operates the patron's call signal, a second relay in said transceiver energized when the start switch is closed in answer to said call signal, apparatus controlled by the energizing of the second relay for automatically setting up the transceiver as a recorder, and mechanism at the central transmitter automatically operative upon the energizing of said second relay for placing said transmitter in condition to transmit the message to the patron's machine which operates to record the same.

GARVICE H. RIDINGS.
FREDERICK G. HALLDEN.
FRANK LESLIE CURRIE.

REFERENCES CITED

The following references are of record in the file of this patent:

UNITED STATES PATENTS

| Number | Name | Date |
|---|---|---|
| 2,386,263 | Ridings et al. | Oct. 9, 1945 |
| 2,408,074 | Koos | Sept. 24, 1946 |
| 2,450,030 | Wise | Sept. 28, 1948 |